United States Patent [19]

Kato

[11] Patent Number: 5,463,387
[45] Date of Patent: Oct. 31, 1995

[54] OPTICAL MOUSE AND RESIN LENS UNIT

[75] Inventor: Takaaki Kato, Suwa, Japan

[73] Assignee: Nissin Kohki Co., Ltd., Nagano, Japan

[21] Appl. No.: 996,776

[22] Filed: Dec. 23, 1992

[30] Foreign Application Priority Data

Dec. 27, 1991 [JP] Japan .................................. 3-346982

[51] Int. Cl.$^6$ ................................................. H01J 3/14
[52] U.S. Cl. ......................... 341/31; 345/166; 250/237 R; 250/229; 359/649
[58] Field of Search ................................ 345/166; 341/31; 250/237 R, 221, 229, 237 G; 359/800, 637, 649, 727, 728

[56] References Cited

U.S. PATENT DOCUMENTS

| | | | |
|---|---|---|---|
| 4,647,771 | 3/1987 | Kato | 345/166 |
| 4,751,505 | 6/1988 | Williams et al. | 345/166 |
| 4,834,502 | 5/1989 | Bristol et al. | 340/710 |
| 4,880,967 | 11/1989 | Kwang-Chien | 345/166 |
| 4,935,619 | 6/1990 | Heberle | 345/166 |
| 4,993,816 | 2/1991 | Yoshioka et al. | 359/649 |
| 5,051,736 | 9/1991 | Bennett et al. | 340/707 |
| 5,075,541 | 12/1991 | Chien | 345/166 |
| 5,086,197 | 2/1992 | Liou | 345/166 |

Primary Examiner—James J. Groody
Assistant Examiner—Glenton B. Burgess
Attorney, Agent, or Firm—McAulay Fisher Nissen Goldberg & Kiel

[57] ABSTRACT

An optical mouse comprises an illumination system for converging light emitted from a light emitting element to a light pattern of a mouse pad, an image forming system for forming an image of the light pattern on the side of a light receiving element and an aspherical lens having a positive refractive index and formed with an aspherical surface in at least one surface thereof. The aspherical surface is used for the illumination system and/or the image forming system. In a preferred form, the aspherical lens is a single lens made of a synthetic resin for constituting the image forming system and satisfying the following optical conditions:

$2 < |\beta| < 15$ $0.2 < r_1 \cdot (n-1)/f$ $-3 < K_2 < 0$ $0.012 < NA < 0.18$ where $\beta$ = a magnification $r_1$: a radius of curvature of a surface of the lens on the mouse pad side;

n: the refractive index of lens material in wave length: 950 nm);

f: a focal distance $K_2$: a cone coefficient; and

NA: the number of apertures.

7 Claims, 24 Drawing Sheets

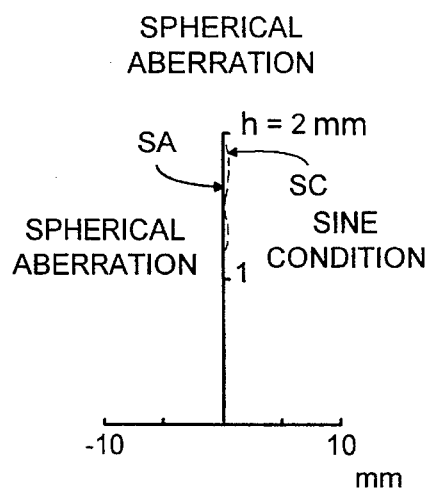
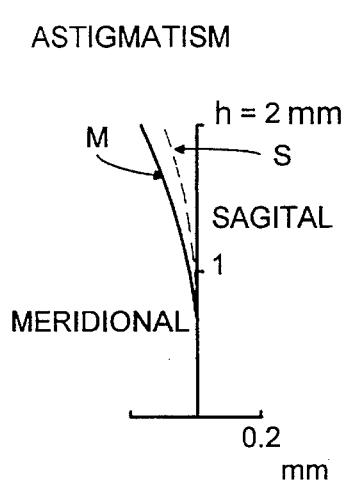
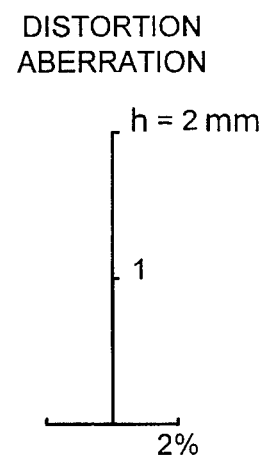
FIG. 2A  FIG. 2B  FIG. 2C
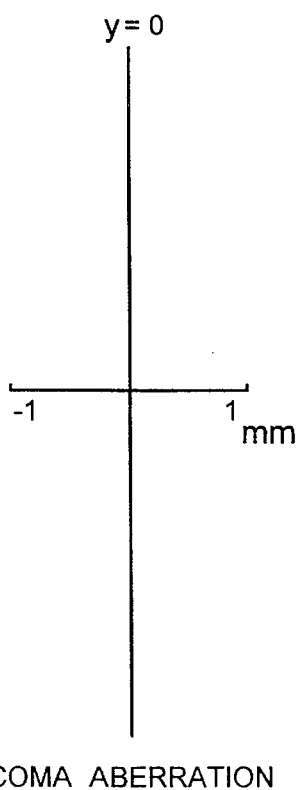
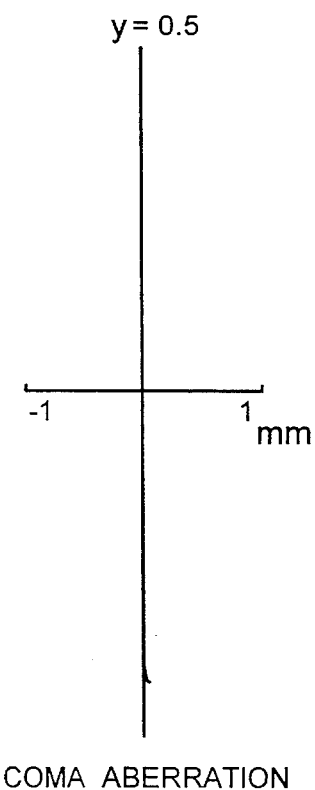
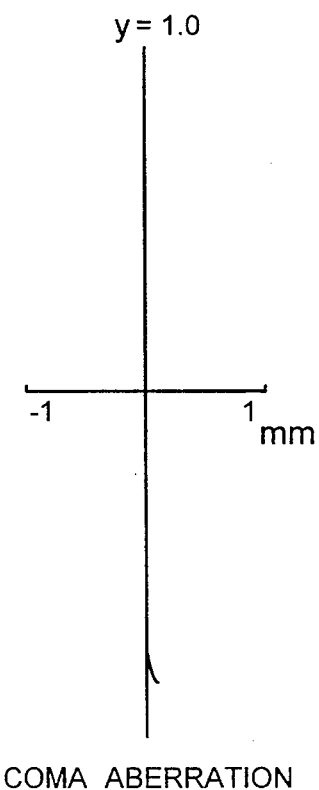
FIG. 2D  FIG. 2E  FIG. 2F

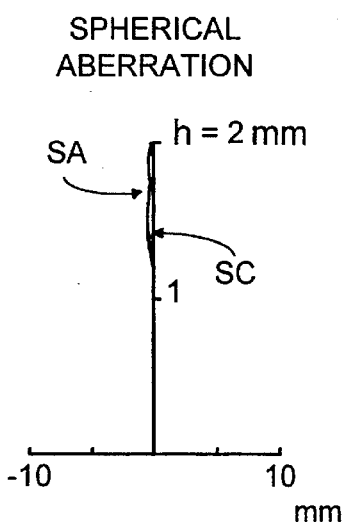
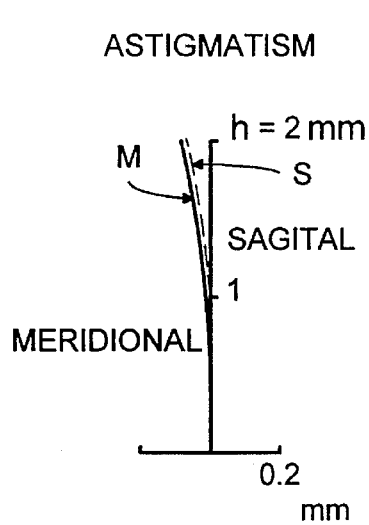
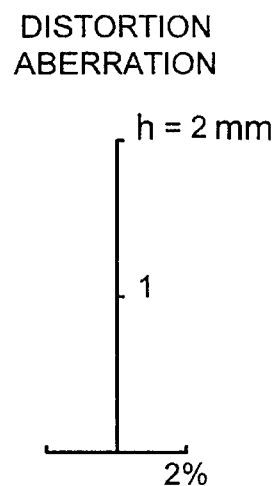
FIG. 4A  FIG. 4B  FIG. 4C
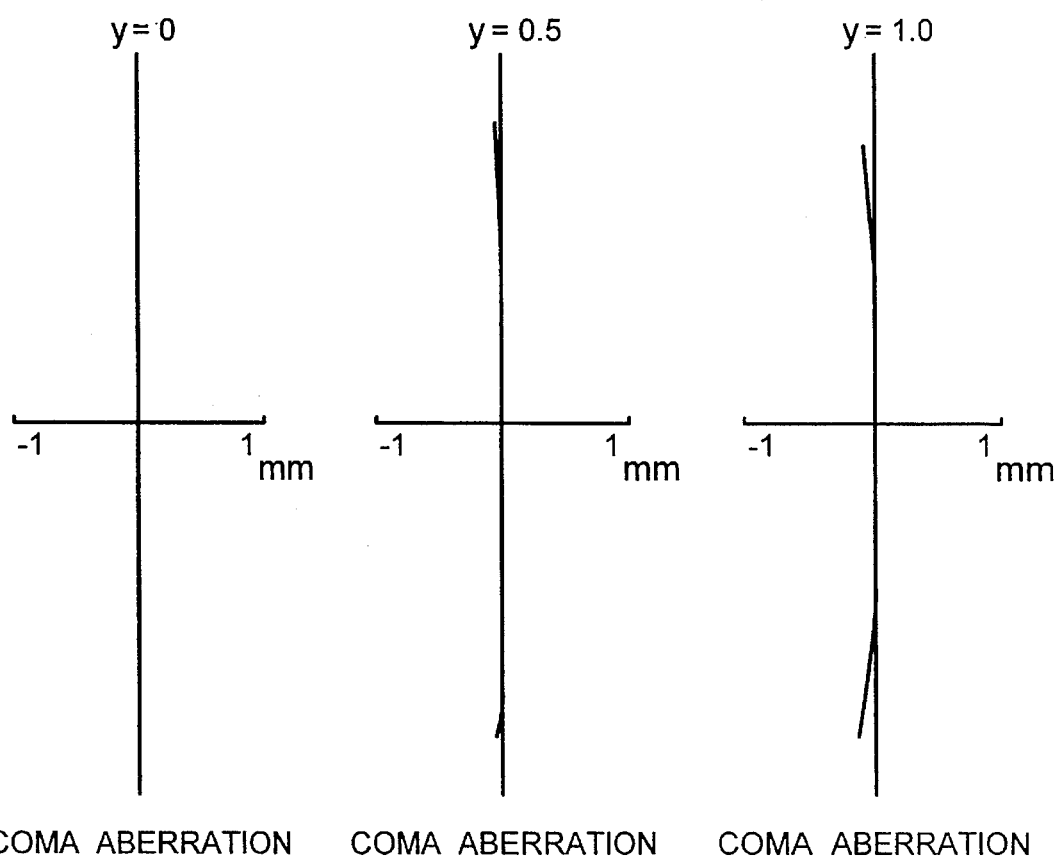
FIG. 4D  FIG. 4E  FIG. 4F

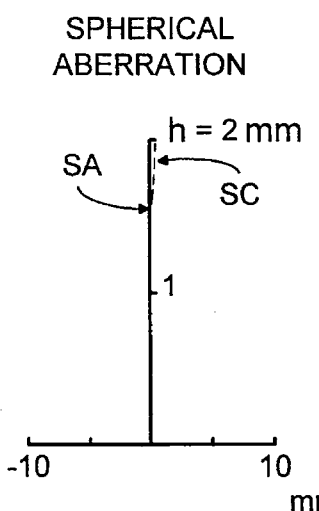
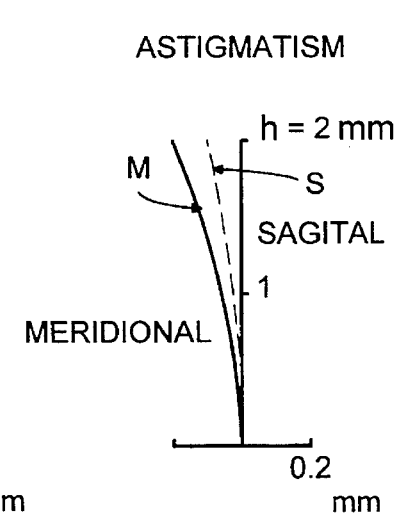
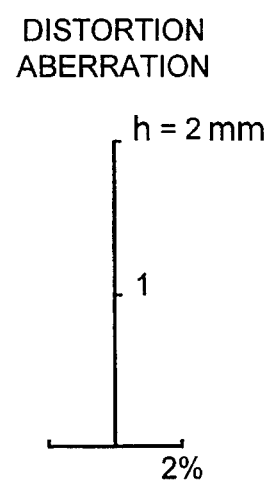
FIG. 5A  FIG. 5B  FIG. 5C
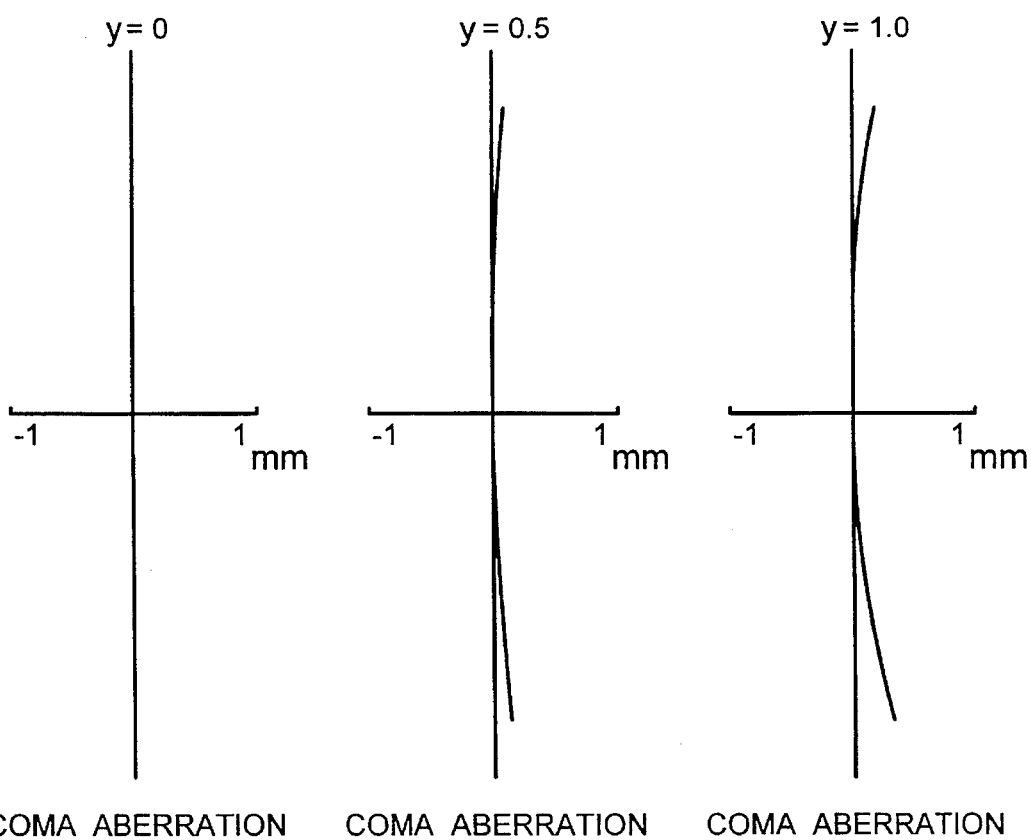
FIG. 5D  FIG. 5E  FIG. 5F

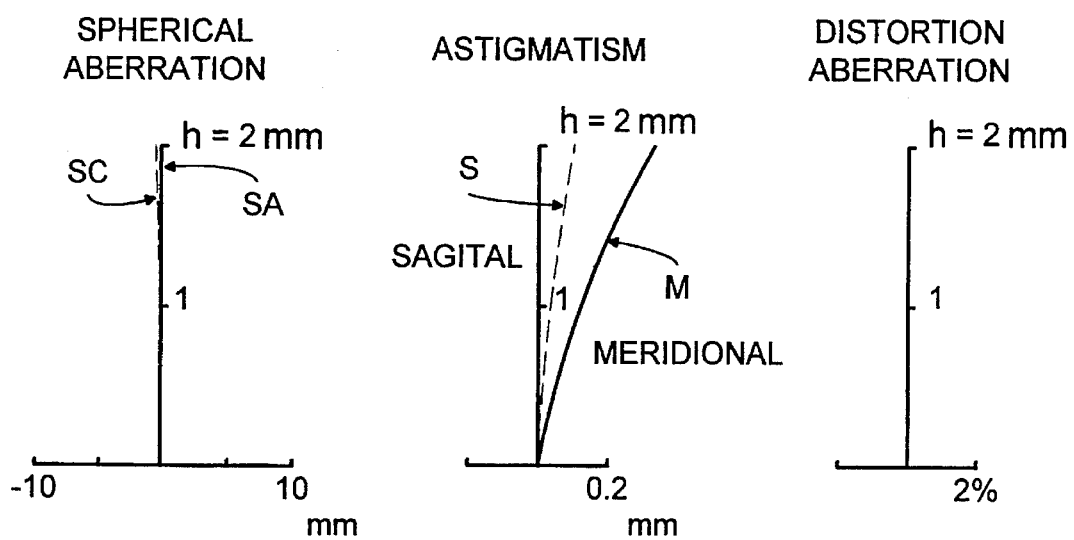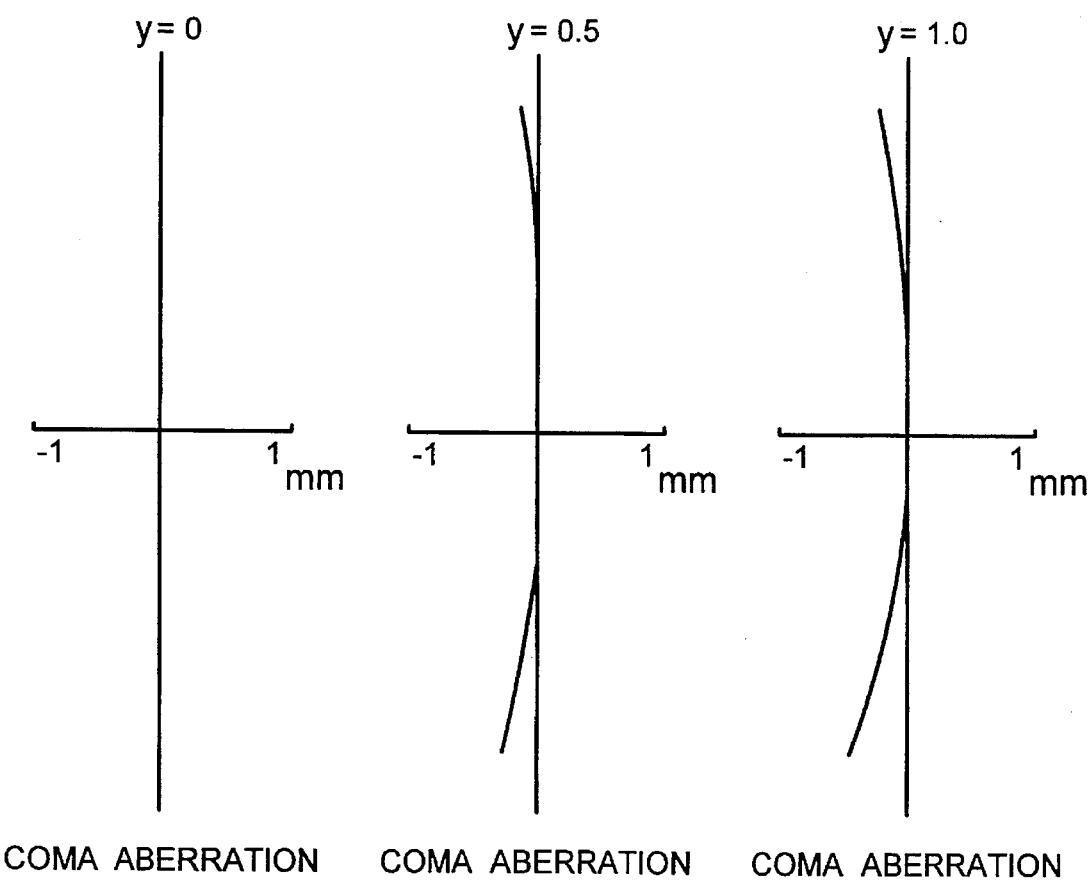

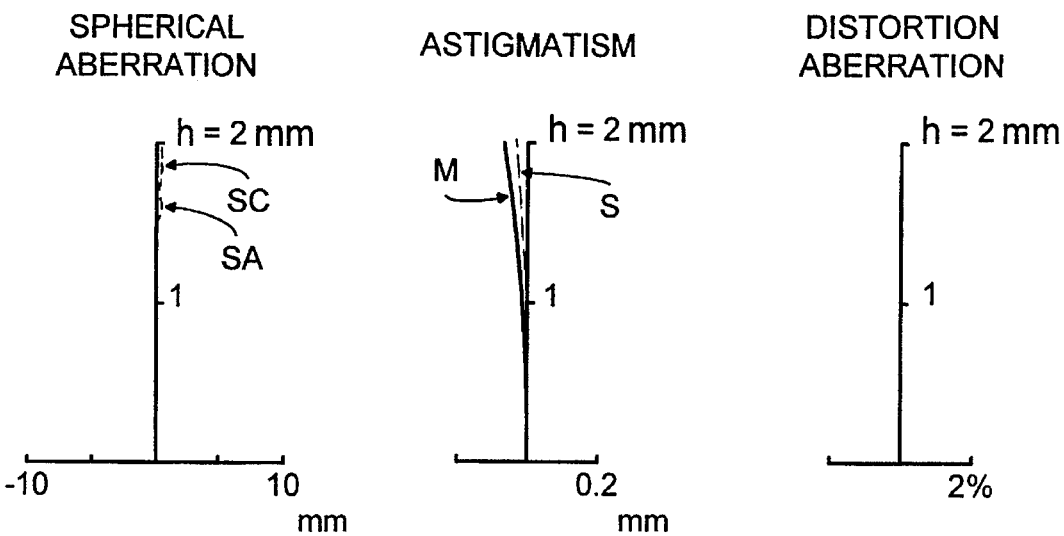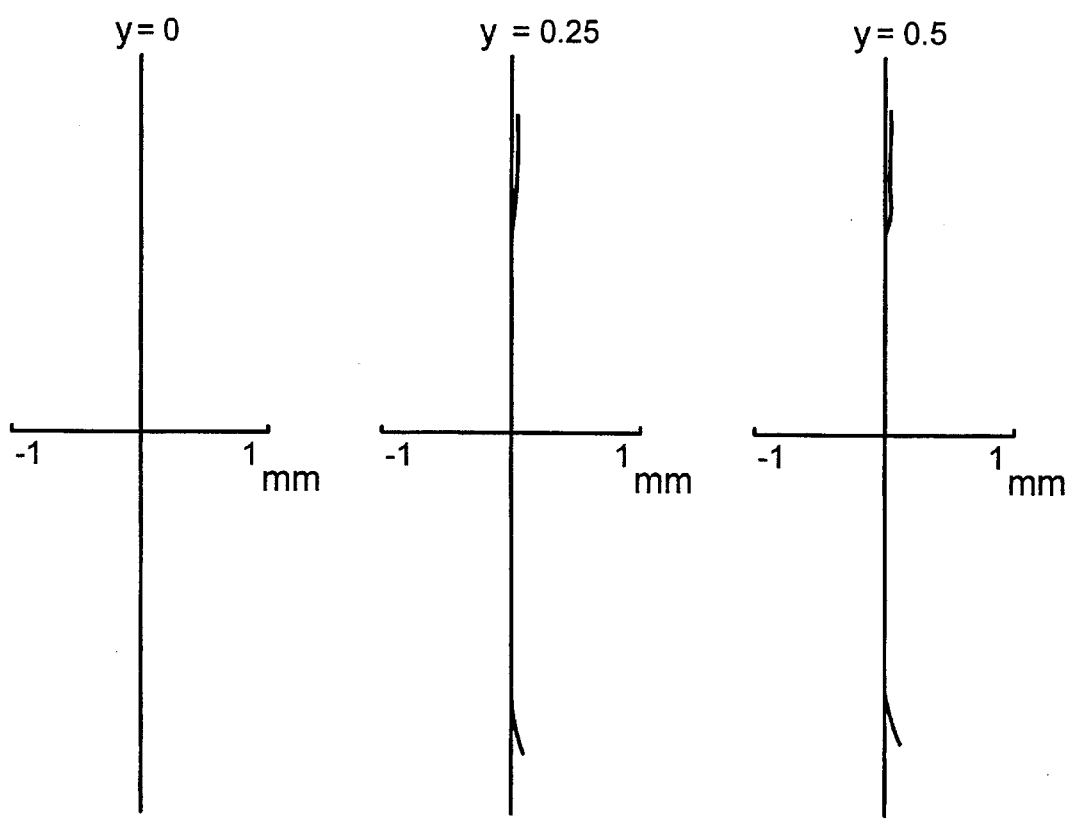

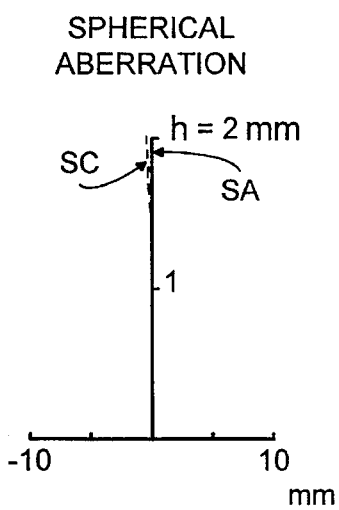
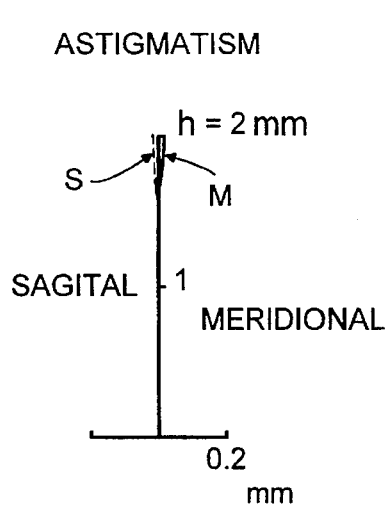
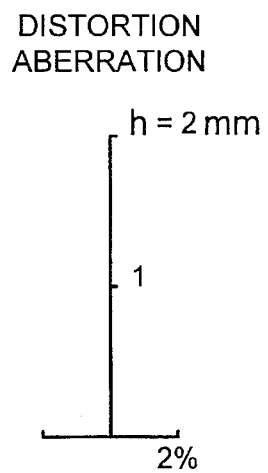
FIG. 8A  FIG. 8B  FIG. 8C
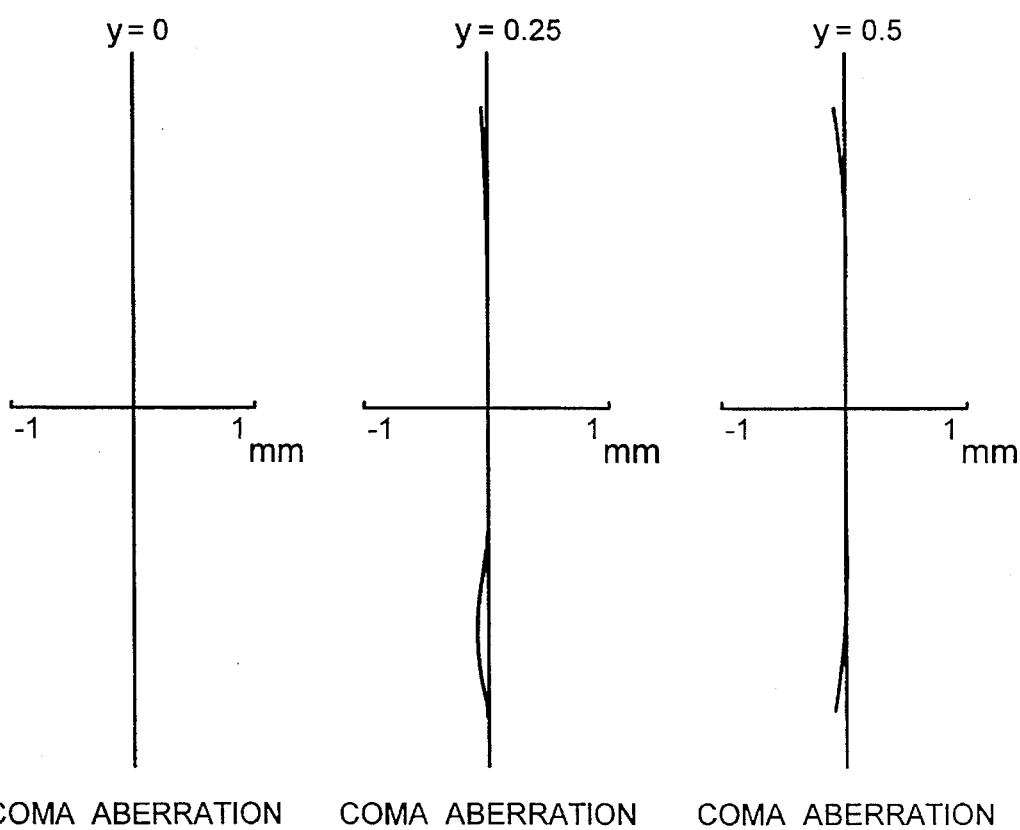
FIG. 8D  FIG. 8E  FIG. 8F

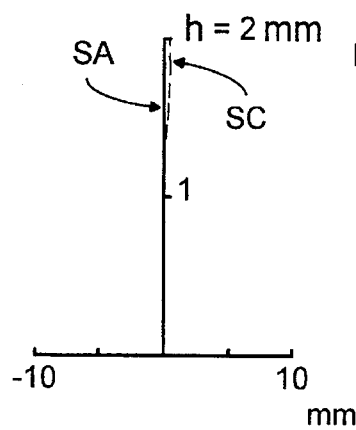
FIG. 9A SPHERICAL ABERRATION
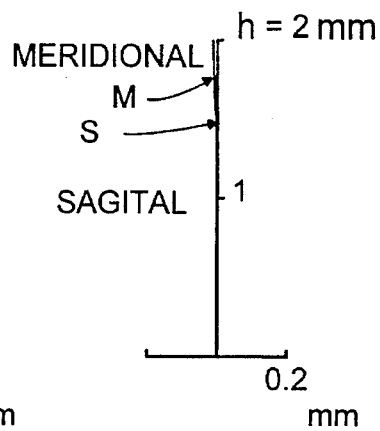
FIG. 9B ASTIGMATISM
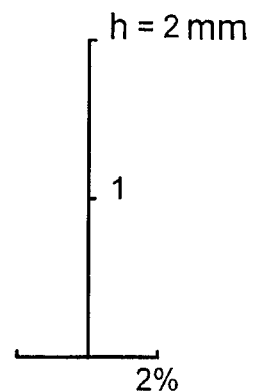
FIG. 9C DISTORTION ABERRATION
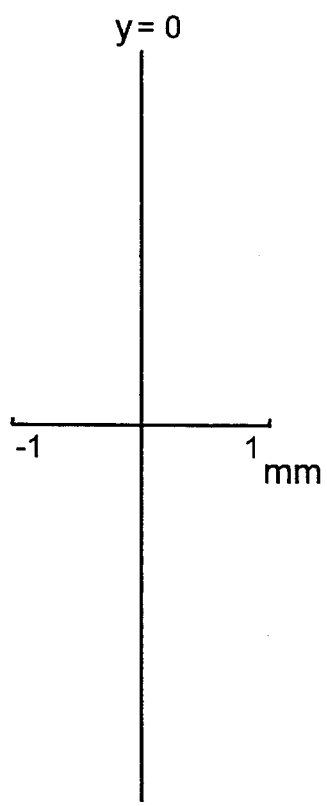
COMA ABERRATION
FIG. 9D
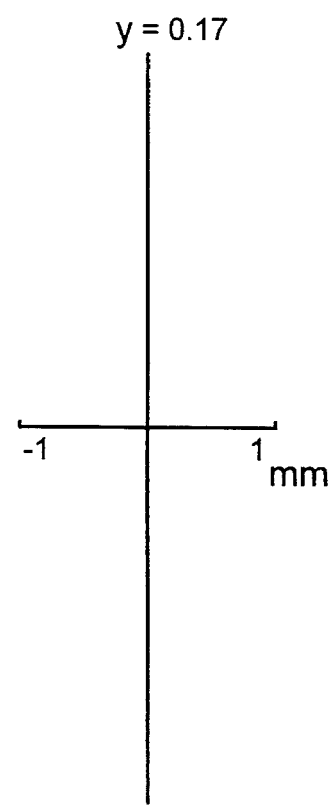
COMA ABERRATION
FIG. 9E
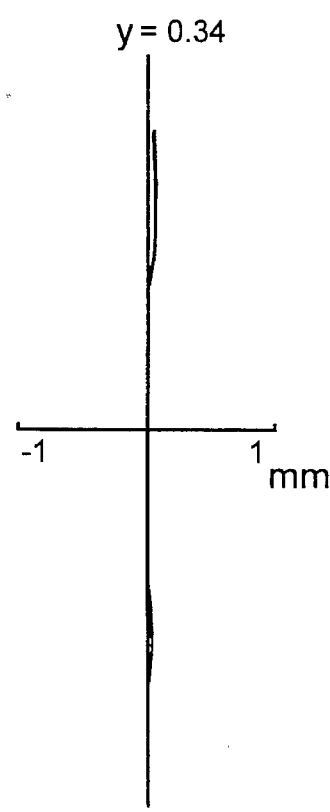
COMA ABERRATION
FIG. 9F

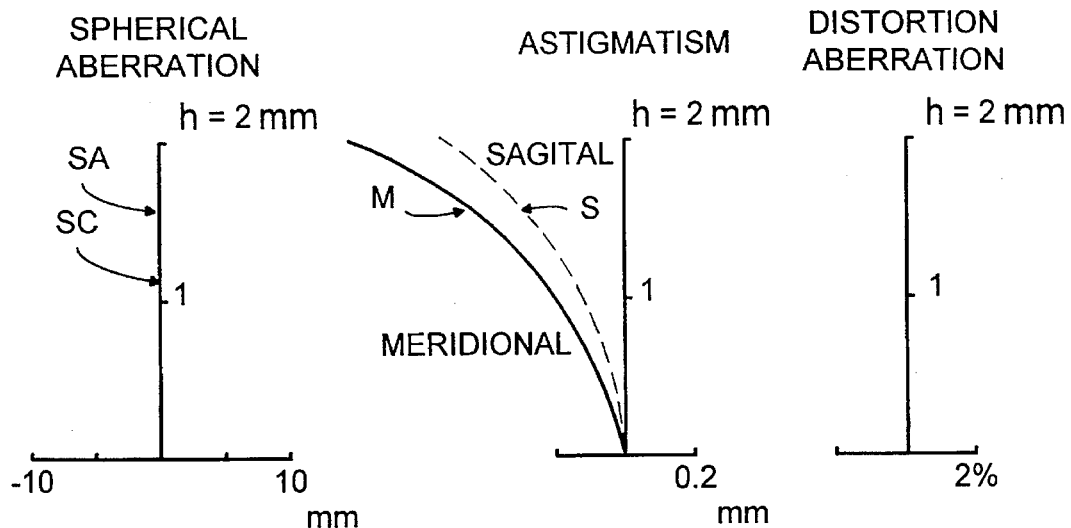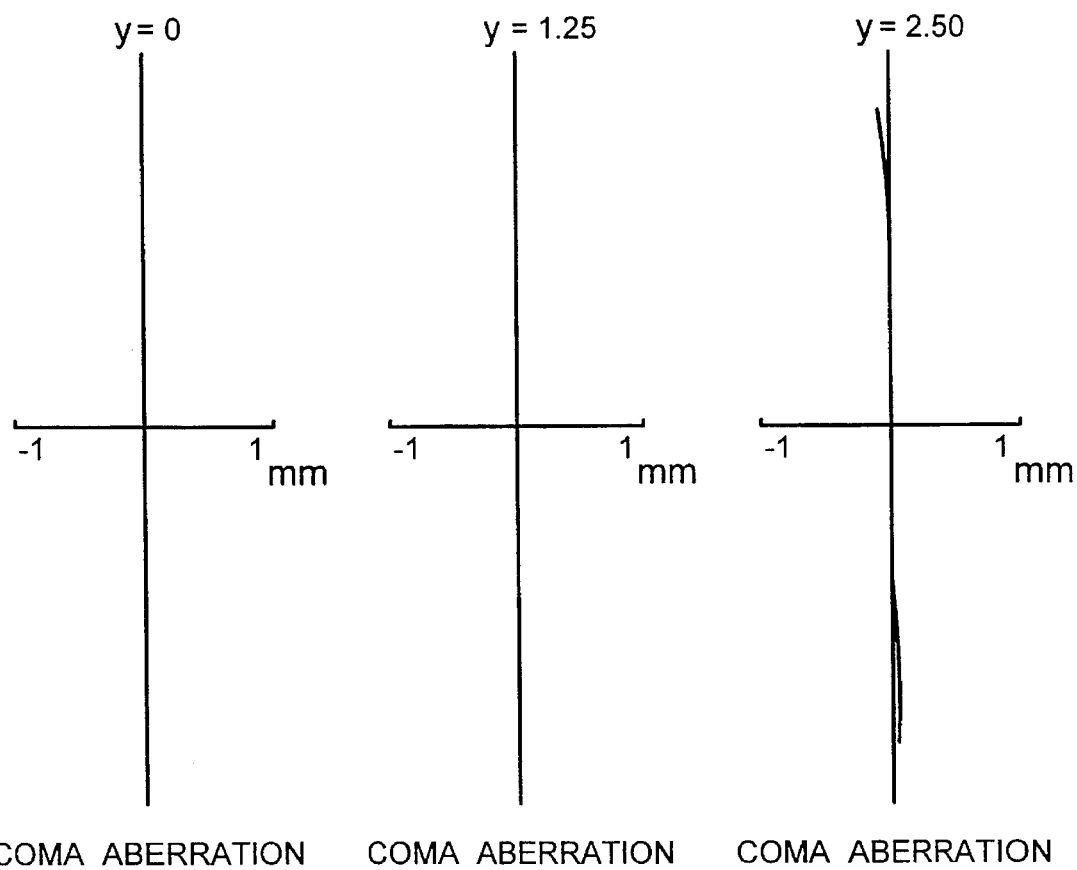

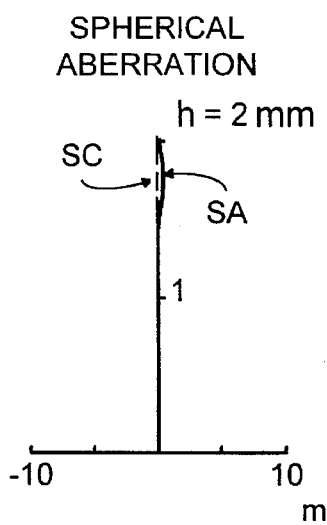
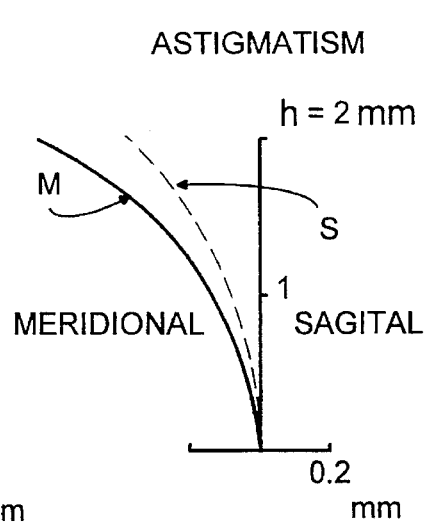
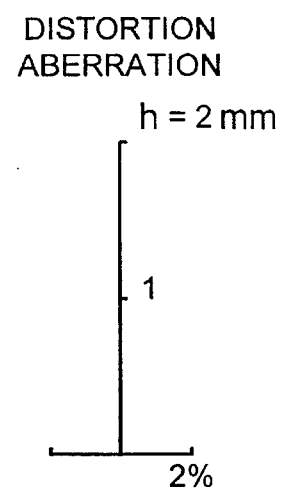
FIG. 11A  FIG. 11B  FIG. 11C
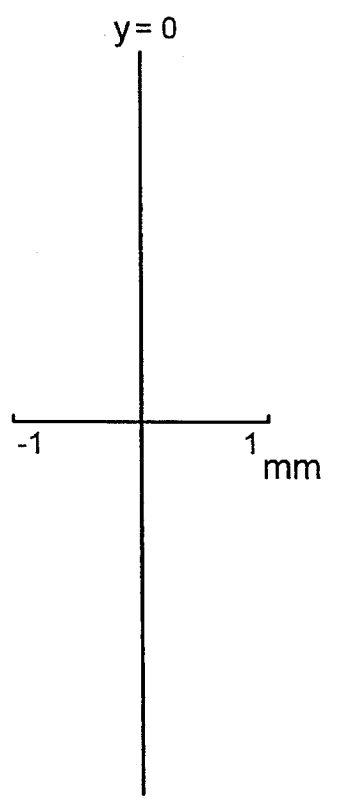
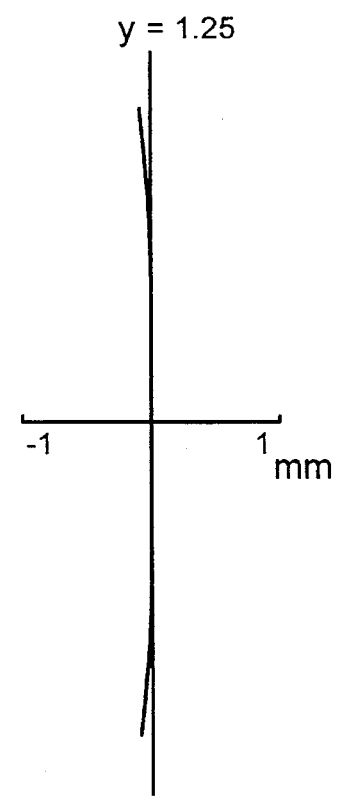
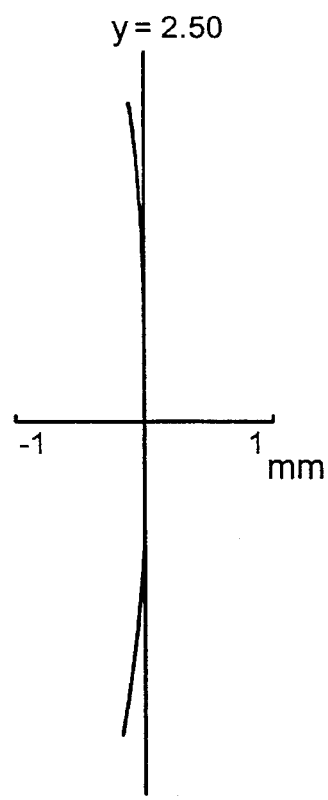
FIG. 11D  FIG. 11E  FIG. 11F

COMA ABERRATION

COMA ABERRATION

COMA ABERRATION

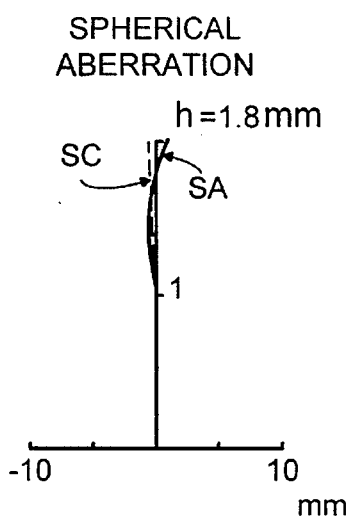
FIG. 13A SPHERICAL ABERRATION
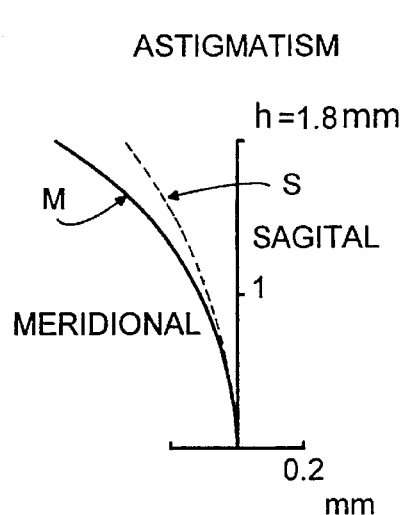
FIG. 13B ASTIGMATISM
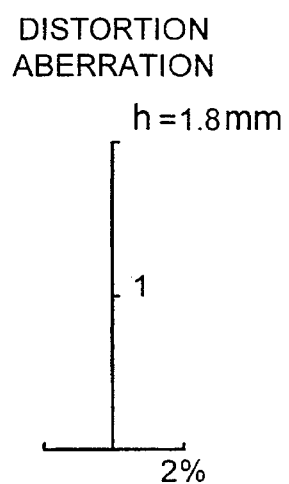
FIG. 13C DISTORTION ABERRATION
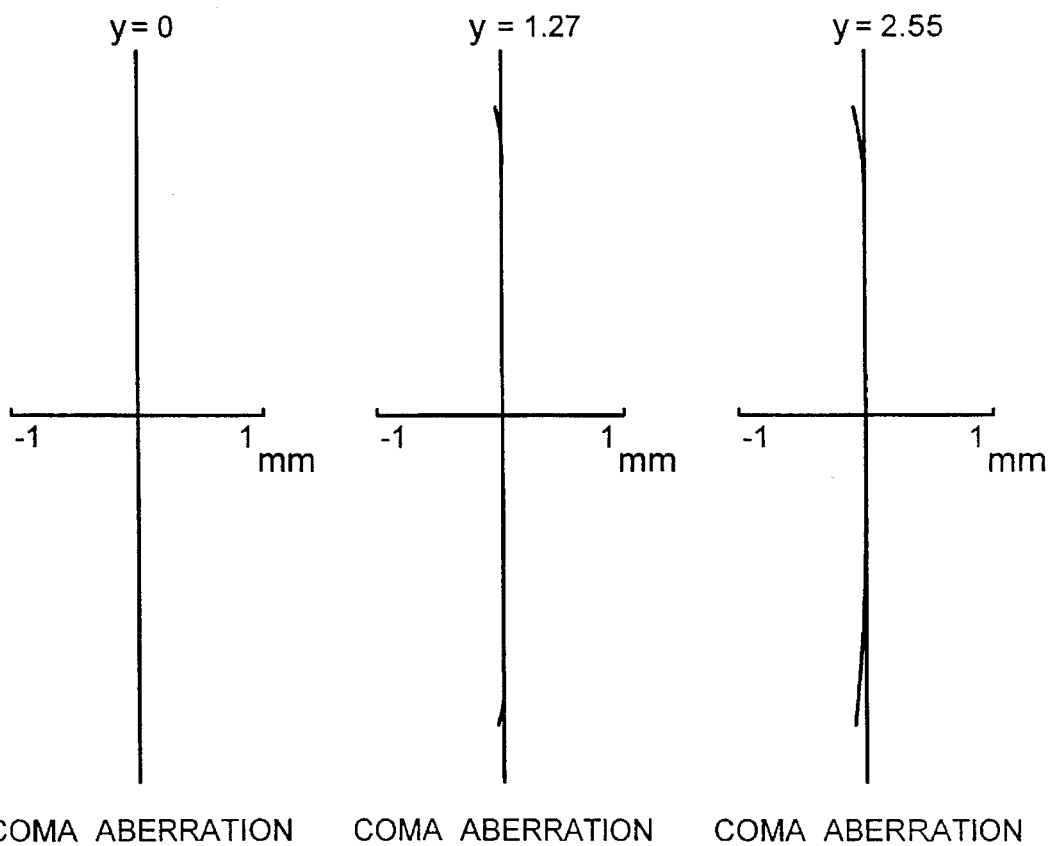
FIG. 13D COMA ABERRATION
FIG. 13E COMA ABERRATION
FIG. 13F COMA ABERRATION

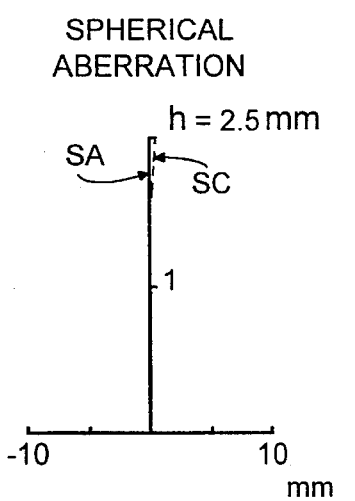
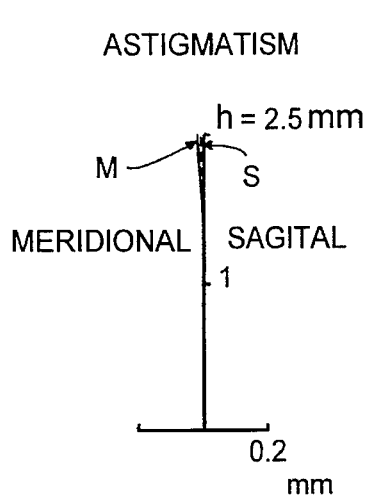
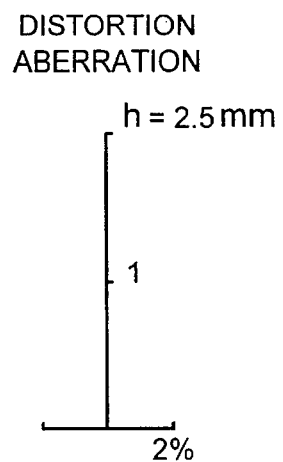
FIG. 15A  FIG. 15B  FIG. 15C
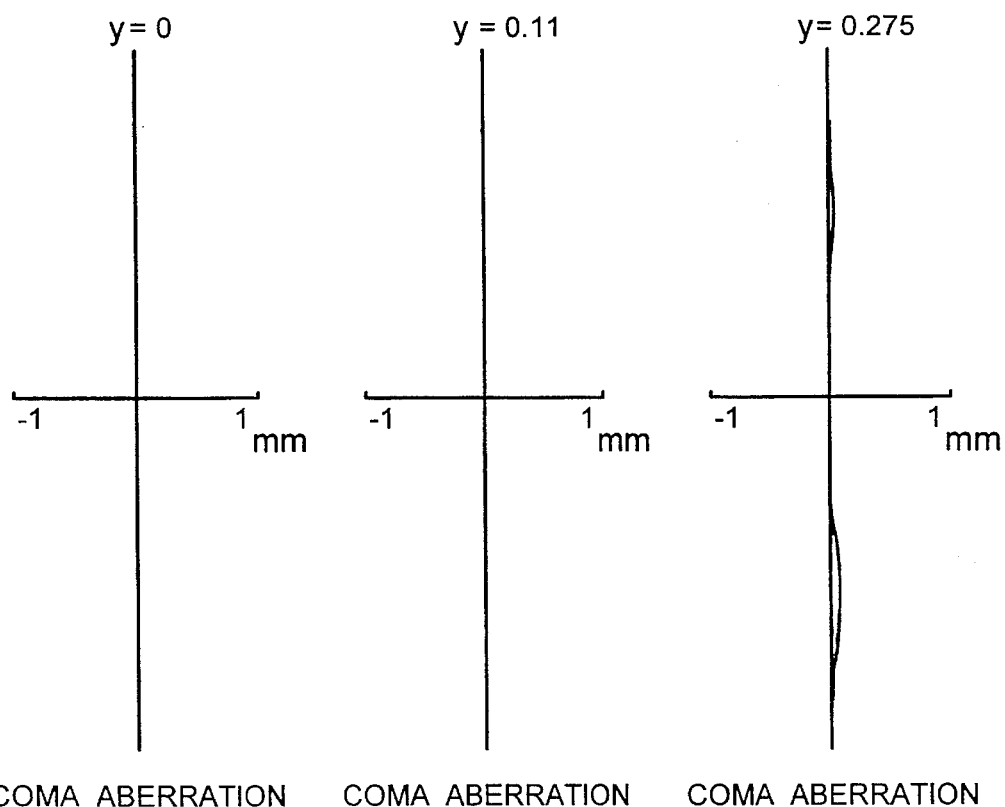
FIG. 15D  FIG. 15E  FIG. 15F

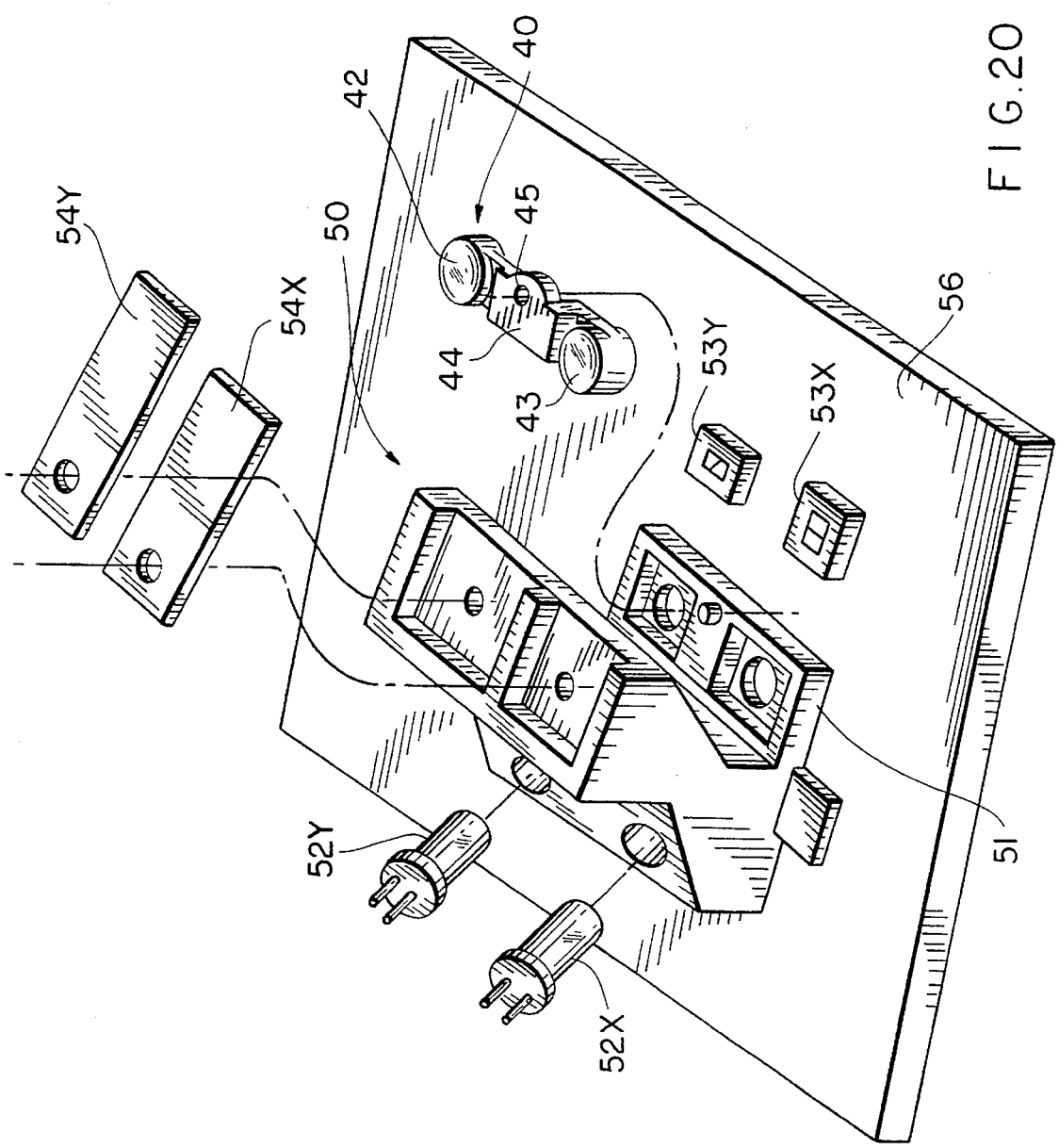

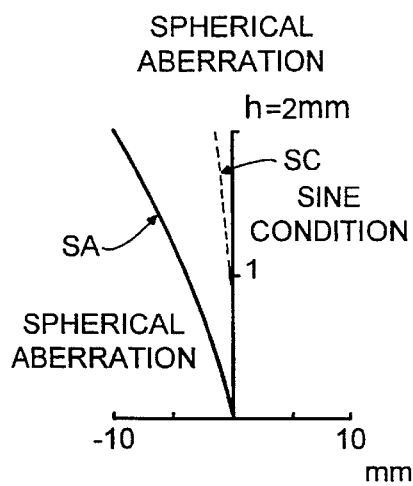
FIG. 25A
PRIOR ART
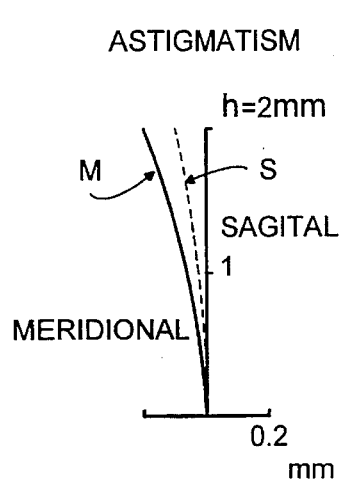
FIG. 25B
PRIOR ART
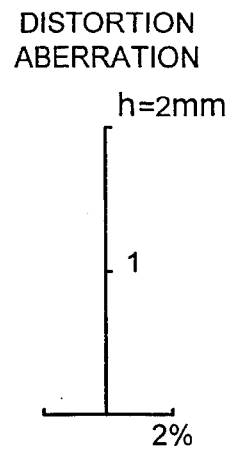
FIG. 25C
PRIOR ART
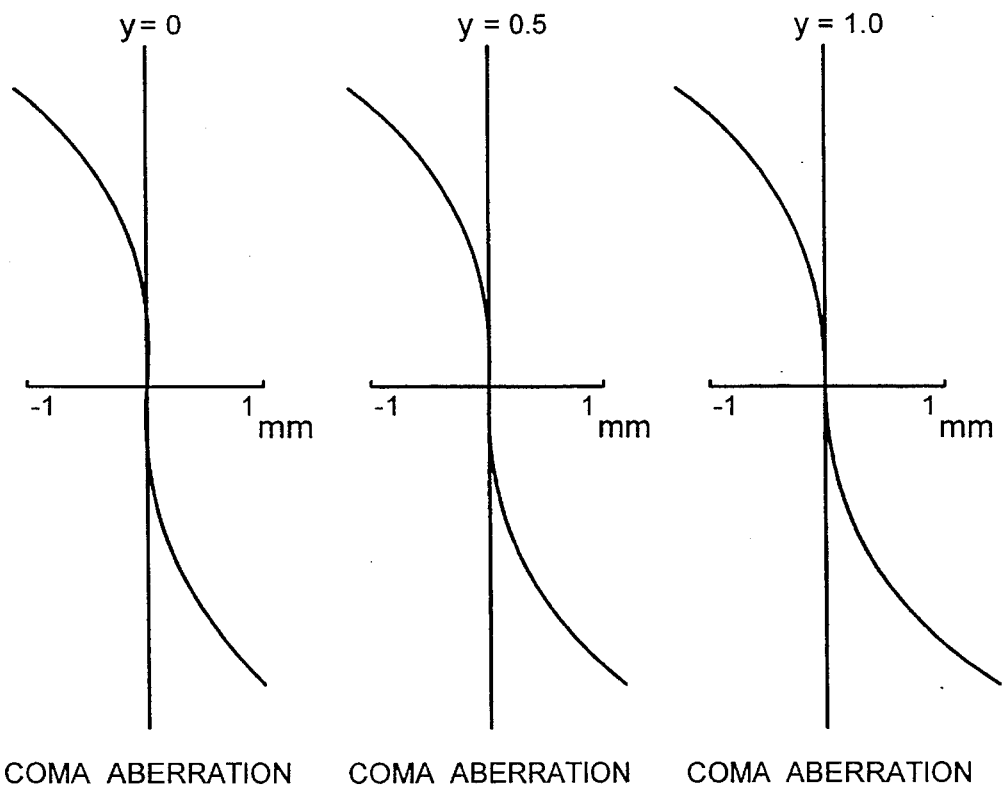
FIG. 25D
PRIOR ART
FIG. 25E
PRIOR ART
FIG. 25F
PRIOR ART

OPTICAL MOUSE AND RESIN LENS UNIT

BACKGROUND OF THE INVENTION a) Field of the Present Invention

The present invention relates to an optical mouse for moving a cursor displayed on a picture of a display unit such as a CRT (cathode ray tube) or an LCD (liquid crystal display), and more specifically to an improvement of an optical mouse and a resin lens unit applicable to the optical mouse.

b) Related Art

The optical mouse is referred to as a cursor position designating device, which can move a cursor in both X- and Y-axis directions freely on a picture of the display unit such as a CRT.

When this optical mouse is freely moved horizontally and vertically on a mouse pad, the cursor can be moved in both the X- and Y-axis directions on the display unit picture in correspondence with the movement of the optical mouse.

The conventional optical mouse, for example, as disclosed in Japanese Published Examined Patent Application No. 1-39128, provides that the optical mouse includes two line pattern reading apparatuses for reading line patterns formed on a mouse pad, respectively. The line patterns are formed on both surfaces of a transparent substrate of the mouse pad, respectively.

In more detail with reference to FIG. 21, the optical mouse 100 is mainly composed of a housing 112 of reversed-cup shape; a bottom plate 113 for closing the bottom opening of the housing 112; two line reading apparatuses 110X and 110Y mounted on the bottom plate 113; and a circuit board (not shown) for processing electric signals supplied from the line reading apparatuses 110X and 110Y, respectively.

On the other hand, as shown in FIG. 22, the mouse pad 101 is composed of a transparent substrate 111, and two line patterns 102X and 102Y formed by thin parallel lines described on both surfaces of the substrate 111. The substrate 111 is made of a 5 mm thick acrylic resin of roughly A 4 size having a width of about 210 mm and a length of about 300 mm.

The line pattern 102X designates the movement of the cursor in the X-axis direction. The pattern 102X is formed by printing, coating or vacuum depositing a light reflective substance on the right side of the substrate 111. On the other hand, the line pattern 102Y designates the movement of the cursor in the Y-axis direction. The pattern 102Y is formed on the reverse side of the substrate 111 in the same way as with the case of the line pattern 102X so as to intersect the line pattern 102X at an angle of 90 degrees.

The two line reading apparatus 110X and 110Y are fixed on the bottom plate 113 within the housing 112.

Further, in FIG. 21, the reference numeral 114 denotes sliders for stably positioning the optical mouse 100 on the mouse pad 101 so as to be movable on the surface thereof at a right position or attitude.

The location of the optical mouse 100 on the mouse pad 101 can be determined by counting the number of lines of the line pattern 102X in the X-axis direction and further the number of lines of the line pattern 102Y in the Y-axis direction. On the other hand, the cursor displayed on the CRT picture can be determined in correspondence with the position of the optical mouse 100 on the mouse pad 101.

In other words, the movement of the optical mouse 100 on the mouse pad 101 and the movement of the cursor on the CRT picture correspond to each other in one-to-one corresponding relationship. Since the movements of both are two-dimensional, it is possible to determine the X and Y coordinates (a position in the X-axis direction and a position in the Y-axis direction) geometrically. Further, the mutual movement relationship between the two can be processed by a circuit (not shown).

Now, as shown in FIG. 23(A), the X line pattern reading apparatus 110X comprises a light emitting element (LED) 103X for emitting light onto the X line pattern 102X formed on the right side of the transparent substrate 111, a light receiving element 104X for detecting the line pattern 102X, and a convex lens 105X for forming a real image of the X line pattern 102X on the light receiving element (LED) 104X. Further, as shown in FIG. 23(B), the Y line pattern reading apparatus 110Y comprises a light emitting element (LED) 103Y for emitting light onto the Y line pattern 102Y formed on the reverse side of the transparent substrate 111, a light receiving element 104Y for detecting the Y line pattern 102Y, and a convex lens 105Y for forming a real image of the Y line pattern 102Y on the light receiving element (LED 104Y). In the conventional transparent substrate 111 in both the right and reverse surfaces of which X line pattern 102X and Y line pattern 102Y are formed, that is, in the prior art mouse pad 101, the line pattern having a line width of 0.5 mm and a line space of 0.5 mm is formed, respectively, so as to provide a resolving power of 100 CPI (count per inch). The conventional image forming lenses 105X and 105Y used for the reading apparatuses adapted to the mouse pad 101 as described above are of spherical biconvex resin lens (e.g. acrylic resin), which can satisfy the following optical conditions, for instance:

Focal distance: f=5.26 mm

Magnification: $\beta = -4$

Number of aperture: NA= 0.11

Refractive index (in wave length: 950 nm): n=1.484

Radius of curvature on object side: $r_1 = 8$ mm

Radius of curvature on image plane side: $r_2 = -3.28$

Central lens thickness: d= 3 mm

Lens diameter: $\phi = 4$ mm

Problems to be Solved by the Invention

FIG. 24 shows the optical paths of the mouse pad reading apparatus having a resolving power 200 CPI (count per inch) twice as large as the conventional mouse pad resolving power, to which the two image forming lenses 105X and 105Y satisfying the above-mentioned optical conditions are applied. In the drawing, the reference numeral 102 (102X and 102Y) denotes a line on the mouse pad; 105 denotes a spherical lens satisfying the above-mentioned optical conditions; and 106 denotes a formed image. Further, in FIG. 24, light beams directed from the line 102 (102X and 102Y) to the light receiving elements 104X and 104Y are shown under consideration of the spherical aberration. As also shown in FIG. 23, the light receiving elements 104X and 104Y are required to be composed of a pair of light receiving elements 104X and 104Y or light receiving portions 104a and 104b in order to obtain a phase difference signal for detecting the movement direction (positive or negative direction) of the optical mouse. The phase difference signal is explained as follows: when the optical mouse is moved, the light energies inputted to the two light receiving elements 104X and 104Y, respectively, vary with respect to time, so that the wave forms of the signals outputted from the two light receiving elements 104X and 104Y also vary. The change in waveform between the two output signals with respect to time can be represented as a phase difference and detected as a phase different signal. Therefore, the movement direction of the optical mouse can be determined on the basis of the phase difference. Accordingly, since the light receiving elements 104X and 104Y are required to be composed of a pair of light receiving elements 104X and 104Y or light receiving portions 104a and 104B, it is preferable that the area of the image is twice as large as the area of the light receiving elements 104X and 104Y or the light receiving portions 104a and 104b. Here, when the size of the light receiving element 104X or 104Y or the light receiving portion 104a or 104b is 0.5 mm ×0.5 mm and the resolving power is 200 CPI, since the line width is 0.25 mm, in order to obtain an image of 1 mm in size, it is necessary to adjust the positions of the line 102 (102X and 102Y), the lenses 105 (105X and 105Y) and the light receiving elements 104X and 104Y, respectively, so that the magnification becomes 4 times.

FIG. 25 is a series of diagrams showing the various aberrations of the lens which satisfies the above-mentioned optical conditions. In the drawing, the ordinate in the spherical aberration, the astigmatism, or the distortion aberration denotes the height of the incident light (the incident height on the pupil of the eye) h, respectively, where h is 2 mm in full scale. Further, in the coma aberration diagrams, y= 0 indicates the coma aberration on the optical axis (height h= 0 mm) on the image plane (the surface of the light receiving element); y= 0.5 mm indicates the coma aberration at a height (h= 0.5 mm) in the direction perpendicular to the optical axis on the surface of the light receiving element; and y= 1.0 mm indicates the coma aberration at a height (h= 1.0 mm) in the direction perpendicular to the optical axis on the surface of the light receiving element. As clearly understood with reference to FIG. 25, since the lens is a spherical lens, the spherical aberration and coma aberration are large. In order to achieve the positional relationship of magnification of 4 ($\beta$=–4), it is originally necessary to position the light receiving element 104 (104X and 104Y) at the image plane 106 shown in FIG. 21. However, since the spherical aberration is large and thereby an unclear line image appears on the image plane 106, in practice, it is necessary to locate the light receiving element 104 (104X and 104Y) at an optimum position within the adjustment range determined away from the image plane 106 toward the lens. In this case, since the above-mentioned relationship of ($\beta$=–4) cannot be satisfied within the adjustment range for locating the light receiving element, the position of the light receiving element 104 must be determined so that the most clear image can be formed at roughly the magnification of 4 times by additionally adjusting the interval between the line 102 (102X and 102Y) and the lens 105 (105X and 105Y). When the optimum position can be determined, if the resolving power is 100 CPI and the line width and the light receiving element are both large, it is possible to barely obtain a photocurrent signal (a signal outputted from the light receiving element for transducing the optical energy (signal) into an electrical signal) and a phase difference signal, as far as the line image is large and therefore the photocurrent is large and further the error in the position adjustment is small. However, when the resolving power is high i.e., such as 200 CPI or more, and further the line width and the light receiving element are both small, even if the above-mentioned adjustment is made as finely as possible, it is impossible to obtain the photocurrent signal; that is, to read the mouse pad. This is because there exists a limit in the detection sensitivity caused by the unclear image resulting from the spherical aberration of the lens. In other words, there exists a problem in that it is necessary to continuously increase the light emission intensity of the light emitting element because of the unclear image, thus increasing the power consumption.

OBJECT OF THE INVENTION

With these problems in mind, therefore, a primary object of the present invention is to provide an optical mouse which can allow the mouse pad to have a higher resolving power than is conventional, to be usable with lower power consumption, and additionally, to provide a resin lens unit suitable for use in the optical mouse.

SUMMARY OF THE INVENTION

To solve the above-mentioned problems, the means for achieving the above object of the present invention is the improvement where an aspherical lens is adopted as the lens of the illumination system or the image forming system of the optical mouse. The aspherical lens is provided with a positive refractive index and formed with at least one aspherical surface. In particular, the aspherical lens for the image forming lens is a single lens, which satisfies the following optical conditions:

$2<|\beta|<15$ $0.2<r_1\cdot(n-1)/f$ $-3<K_2<0$ $0.012<NA<0.18$ wherein $\beta$: the magnification;

$r_1$ the radius of curvature of the surface of the lens on the mouse pad side;

n: the refractive index of lens material (in wave length: 950 nm);

f: the focal distance;

$K_2$: the cone coefficient; and

NA: the number of apertures.

Further, it is preferable that the aspherical lens satisfies the following conditions:

$r_2<r_1$ where $r_2$: the radius of curvature of the surface of the lens 25 on the light receiving element side.

Further, it is preferable that the aspherical lens is formed of a synthetic resin.

Without being limited to the case where the lens surface is formed with an aspherical surface, it is possible to adopt another means for achieving the high resolving power as follows: when the upper or lower surface of the mouse pad is defined as a first surface and the surface opposite to the first surface is defined as a second surface, in the optical mouse provided with an optical system composed of an illumination system for irradiating light upon the line pattern formed on the first surface and a light receiving system having an image forming lens for forming an image of the line pattern, there is provided a light shading member for shading light reflected from the second surface of the mouse pad to the image forming lens.

Further, when at least one aspherical lens is used for each of the illumination system and the image forming system of the optical mouse, it is preferable to construct the lens group as a single unit, from the standpoint of facilitation of the assembly.

For the reason described above, the present invention adopts a resin lens unit having a plurality of lenses formed integral with each other connected through a linking portion. In this case, in particular, the present invention provides the improvement wherein a plurality of lenses are divided right and left into a first lens region and a second lens region with respect to a resin injecting gate provided in the linking portion and additionally a lens unit fixing portion is formed at a region opposite from the gate on the side of a line connecting both the centers of the right and left lens portions. In the construction as described above, it is preferable to form a recessed portion for restricting the flow of resin, in the linking portion on one side of any one of the lenses.

In the case where an aspherical lens having a positive refractive index is adopted as the image forming system, since the spherical aberration can be effectively corrected, it is possible to clearly distinguish the intervals between the lines of the line pattern and thereby to increase the amplitude of the photocurrent signal wave form supplied from the light receiving element of the image forming system. Therefore, the line pattern can be read with a resolving power higher than the conventional resolving power. In addition, since it is possible to eliminate the optimum adjustment of the light receiving elements on the lens side from the image plane, being different from the prior art method, it is possible to simplify the assembling adjustment of the reading apparatus, because the light receiving elements can be set simply and unconditionally on the image plane. Further, since a clear real image can be obtained on the image plane, the phase difference signal obtained between the two light receiving elements can be more easily separatable, thus eliminating a detection error cause din the direction in which the mouse is moved. In addition, since the obtained image is clear without any blur, it is possible to obtain a reliable signal even if the intensity of light to be emitted from the illumination system is reduced. This indicates that it is possible to realize a mouse low in power consumption by economizing the intensity of light to be emitted, as compared with the described prior art mouse. Further, the life expectancy of the elements such as the light emitting elements can be increased.

On the other hand, in the case where an aspherical lens having a positive refractive index is adopted for the illumination system, it is possible to sufficiently correct the spherical aberration. As a result, since the light convergence rate can be increased, it is possible to reduce the power consumption of the light emitting elements, thus economizing the power consumption.

As the magnification of the aspherical lens of the image forming system suitable for the optical mouse, the following condition has been determined:

$$2<|\beta|<15 \qquad (1)$$

Here, when the $\beta$ is less than twice, the size of the light receiving surface of the light receiving element is excessively reduced. This requires a more precise assembly of parts such as lenses and light receiving elements. On the other hand, when the $\beta$ exceeds 15 times, since the optical path length becomes excessively long, the mouse itself is made more compact. Therefore, it is desirable that the magnification $\beta$ satisfies the above-mentioned condition (1).

Further, with respect to the radius of curvature $r_1$ of the surface of the lens on the mouse pad side, the following condition has been found:

$$0.2<r_1 \cdot (n-1)/f \qquad (2)$$

Here, if the value of $r_1 \cdot (n-1)/f$ is less than 0.2, it becomes difficult to correct the spherical error within the effective diameter of the lens.

Further, with respect to the cone coefficient $K_2$ on the image side of the aspherical lens, the following condition has been found:

$$-3<K_2<0 \qquad (3)$$

Under this condition, it is possible to sufficiently correct the spherical aberration. Here, if the K is less than −3, since the radius of curvature of the aspherical surface is large, the lens formability or workability is not preferred. Further, if the K is a positive value, it is difficult to correct the spherical aberration.

In addition, the following condition has been found with respect to the number of the opening NA of the aspherical lens:

$$0.012<NA<0.18 \qquad (4)$$

Here, if the number of the opening is less than 0.012, since the intensity of received light is reduced, it is difficult to discriminate the presence or absence of the lines. Further, if the NA is more than 0.18, since the lens diameter is increased excessively, it is difficult to house the lens itself within the mouse housing.

It is most preferable to use the aspherical lens which satisfies the above-mentioned four conditions for the optical mouse. However, the following condition has been found between the radius $r_1$ of curvature of the surface of the lens on the mouse pad side and the radius $r_2$ of curvature of the surface of the lens on the light receiving element side:

$$r_2<r_1 \qquad (5)$$

Here, in order to minimize the aberration rate, it is preferable to decide both the radii $r_2$ and $r_1$ so that the incident angle upon the $r_1$ surface and the incident angle upon the $r_2$ surface both become as equal to each other as possible. This is realizable under the condition (5) above. As far as $r_2<r_1$, the difference in aberration between the vicinity of the optical axis and the vicinity of the lens becomes larger in the $r_2$ surface. As a result, the effect of correcting the aberration by the aspherical surface is higher in the $r_2$ surface than in the $r_1$ surface. Accordingly, it is preferable to form the aspherical surface in the $r_1$ surface.

Further, when the light shading member is adopted, since it is possible to suppress the unnecessary stray light incident upon the image forming lens and therefore to eliminate the ripple components mixed with the detection signal, the reading performance of a high resolving power can be obtained.

In the mouse reading apparatus, at least a pair of image forming lenses are required. Since the lenses are formed of a synthetic resin, there exist advantages such that the aspherical surface can be easily formed and the lenses can be formed in a single unit by molding the lenses together with a rib, thus reducing the manufacturing cost of the lenses. In addition to the above-mentioned advantages, the resin lens unit according to the present invention has the following advantages: since the fixed portion of the lens unit is formed on the side opposite to the gate, it is possible to make smooth the flow of resin in every nook and corner of both lens portions. The resin not only flows directly from the gate to the lens portion, but also the resin directed to the fixed portion is guided along the circumferential surface thereof from the gate to the furthest portion. Therefore, the local lack of resin can be prevented in the lens portion, thus enabling a highly precise aspherical surface lens. In addition, it is possible to reduce the influence of the stress generated when the fixed portion is mounted upon the lens portion.

Furthermore, in the case where a recessed part for restricting the flow of resin is formed, since the flow of resin toward both the right and left lens portions can be restricted to some extent, the flow of resin to both the lenses can be equalized, so that the precision of the lens surface can be increased.

For a better understanding of the present invention, reference is made to the following description and accompanying drawings while the scope of the invention will be pointed out in the appended claims.

BRIEF DESCRIPTION OF THE DRAWINGS

FIG. 2 is a series of aberration diagrams of an aspherical lens of a first embodiment according to the present invention;

FIG. 4 is a series of aberration diagrams of an aspherical lens of a third embodiment according to the present invention;

FIG. 5 is a series of aberration diagrams of an aspherical lens of a fourth embodiment according to the present invention;

FIG. 6 is a series of aberration diagrams of an aspherical lens of a fifth embodiment according to the present invention;

FIG. 7 is a series of aberration diagrams of an aspherical lens of a sixth embodiment according to the present invention;

FIG. 8 is a series of aberration diagrams of an aspherical lens of a seventh embodiment according to the present invention;

FIG. 9 is a series of aberration diagrams of an aspherical lens of an eighth embodiment according to the present invention;

FIG. 10 is a series of aberration diagrams of an aspherical lens of a ninth embodiment according to the present invention;

FIG. 11 is a series of aberration diagrams of an aspherical lens of a tenth embodiment according to the present invention;

FIG. 13 is a series of aberration diagrams of an aspherical lens of a twelfth embodiment according to the present invention;

FIG. 15 is a series of aberration diagrams of an aspherical lens of a thirteenth embodiment according to the present invention;

FIG. 20 is a cross-sectional view showing an optical mouse using the resin lens unit of the seventeenth embodiment;

FIG. 25 is a series of aberration diagrams of a spherical lens used for the image forming system of the prior art line pattern reading apparatus.

DESCRIPTION OF THE PREFERRED EMBODIMENTS

Embodiments of the present invention will be described hereinbelow.

In a line pattern reading apparatus of an optical mouse according to the present invention, an aspherical lens is adopted as an image forming lens. The aspherical surface is a curved surface obtained by rotating a curved line expressed by the following equation (1) around an optical axis (X axis):

$$X = [CY^2 / (1 + \sqrt{1 - (K+1)C^2Y^2})] + A_4 Y^4 + A_6 Y^6 + \ldots$$

where X denotes the abscissa taken in the optical axis direction; Y denotes the ordinate taken in the direction perpendicular to the optical axis; C denotes the radius of curvature in the vicinity of the center of the optical axis; K denotes the cone coefficient; and $A_4$ and $A_6$ denote the fourth and sixth dimensional aspherical coefficients, respectively.

In the above equation, the eighth and subsequent dimensional expansion terms are omitted. On the basis of the above-mentioned equation, the aspherical surface can be determined by specifying the radius of curvature C in the vicinity of the optical axis, the cone coefficient K, and the aspherical surface coefficients $A_4$ and $A_6$, respectively.

Figure 1:
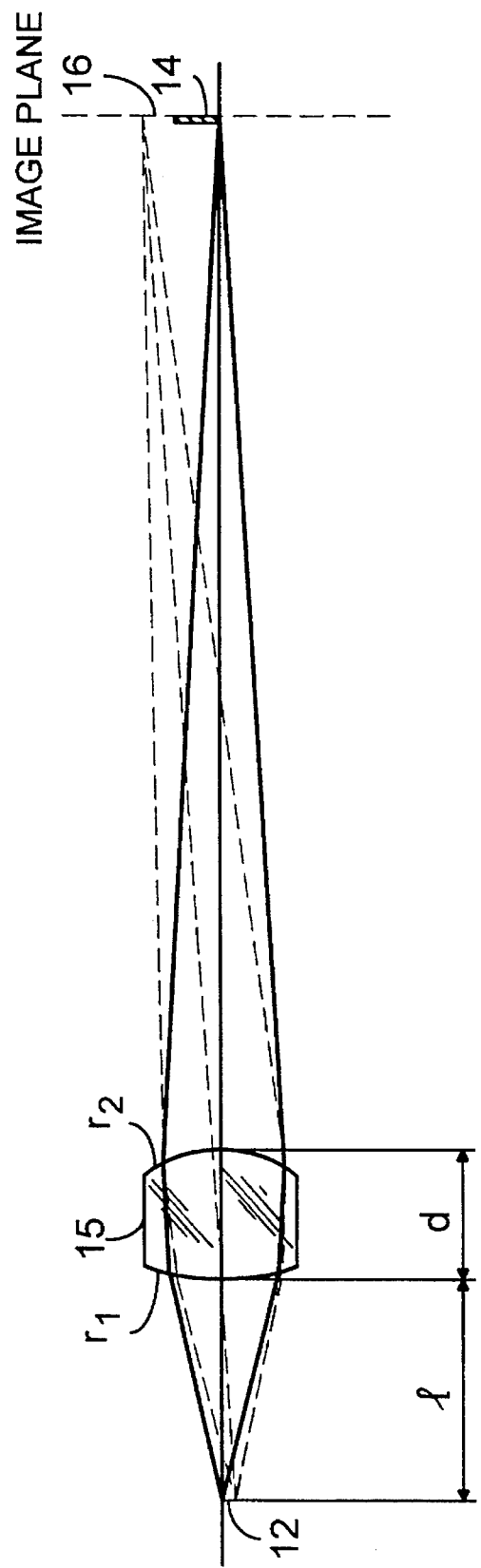
FIG. 1 is an optical path diagram showing the light routes of a line pattern reading apparatus according to the present invention.

FIG. 1 shows optical paths of the line pattern reading apparatus according to the present invention. In the drawing, the reference numeral 12 denotes a line with a width of 0.25 mm described on a mouse pad having a line pattern of 200 CPI; 15 denotes an aspherical lens which satisfies the following respective embodiments of the present invention; 16 denotes a formed image; and 14 denotes a light receiving element with a size of 0.5×0.5 mm. Further, in FIG. 1, the optical system is set in the positional relationship of magnification of 4 times.

Embodiment 1

In this embodiment, the lens 15 is formed with an aspherical surface on both the object plane side $r_1$ and the image plane side $r_2$ respectively, and is formed of a transparent resin, for instance, such as an acrylic resin, under the following optical conditions:

Focal distance: f= 5.26 mm

Number of aperture: NA= 0.07

Magnification: β= −4

Refractive index: n= 1.484

Central thickness: d= 3 mm

Lens diameter: $\phi = 4$ mm $r_1$ surface: aspherical surface

Radius of curvature: $r_1$=8 mm (near the optical axis on the object side)

$r_1(n-1)/f$=0.738

$K_1$=−2.46691×10$^{-3}$; $A_4$=−2.70520×10$^{-3}$; $A_6$= −2.18832× 10$^{-7}$;

$r_2$ surface: aspherical surface

Radius of curvature: $r_2$=−3.28 mm (near the optical axis on the image plane side)

$K_2$= −4.77230×10$^{-1}$; $A_4$=1.38708×10$^{-3}$; $A_6$= 6.59797× 10$^{-7}$

FIG. 2 shows a series of the aberration diagrams of the aspherical lens related to this first embodiment. FIG. 2 indicates that both the spherical aberration and the coma aberration are sufficiently corrected almost down to zero. When the aspherical lens, which satisfies the above-mentioned conditions, is applied to the line pattern reading apparatus, as shown in FIG. 1, a light beam emitted from the line 12 is image formed on the light receiving element 14 located at roughly the magnification of 4 times. Since the lens 15 has almost no aberration, the real image is clear without blur. Accordingly, the optical mouse as described above exerts the following effect:

(1) Since the intervals between the two adjacent lines can be easily distinguishable, it is possible to increase the amplitude of the photocurrent signal. Therefore, it is possible to read the line pattern with a high resolving power approximately higher than 200 CPI.

(2) Since the optimum adjustment of the light receiving element on the lens side away from the image plane as required for the prior art apparatus can be eliminated and therefore the light receiving element can be easily set on the image plane, it is possible to facilitate the assembly and adjustment work of the reading apparatus.

(3) Since a clear real image can be obtained on the image plane and thereby the phase difference signal obtained by the two light receiving elements can be easily separated, it is possible to eliminate the detection error in the mouse movement direction.

(4) Since a clear image can be obtained without any blur, it is possible to obtain a reliable signal in spite of a low intensity of light emitted from the light emitting diode disposed on the light emitting side. In other words, it is possible to realize a mouse of low power consumption by reducing the intensity of light, as compared with the prior art apparatus. Further, it is also possible to increase the life expectancy of the elements such as the light emitting diodes.

Embodiment 2

In the first embodiment, the lens 15 is formed with an aspherical surface on both the object plane side $r_1$ and the image plane side $r_2$ respectively. However, in the case of the lens for the optical mouse, since the number of aperture NA is relatively small, even if either one of the surfaces on the mouse pad side ($r_1$ surface) and the light receiving element side ($r_2$ surface) is formed with an aspherical surface, it is possible to obtain the same effect as with the case of the first embodiment. In other words, in this second embodiment, the lens is formed with an aspherical surface only in the $r_2$ surface, and is formed of a resin, for instance, such as an acrylic resin, under the following optical conditions:

Focal distance: f=5.2 mm

Number of aperture: NA= 0.067

Magnification: $\beta$=−4

Refractive index: n= 1.484

Central thickness: d= 3 mm

Lens diameter: $\phi$= 4 mm $r_1$ surface: spherical surface

Radius of curvature: $r_1$= 7 mm $r_1(n-1)/f$= 0.652

$r_2$ surface: aspherical surface

Radius of curvature: $r_2$= −3.385 mm (near the optical axis on the image plane side)

$K_2$=−1.033603; $A_4$=1.1492×10$^{-3}$; $A_6$= 6.2824 ×10$^{-7}$

Figures 3A, 3B, 3C:
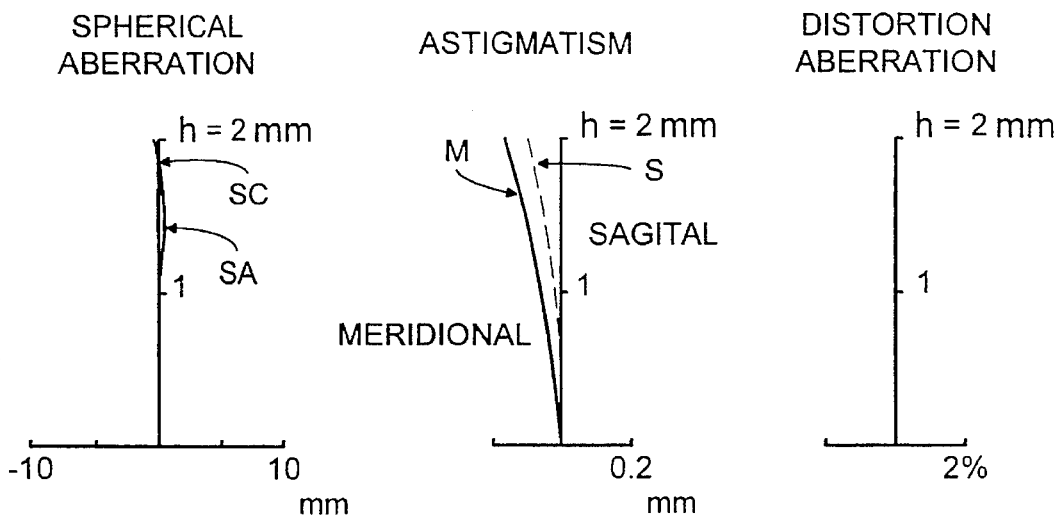
FIG. 3 is a series of aberration diagrams of an aspherical lens of a second embodiment according to the present invention.
Figures 3D, 3E, 3F:
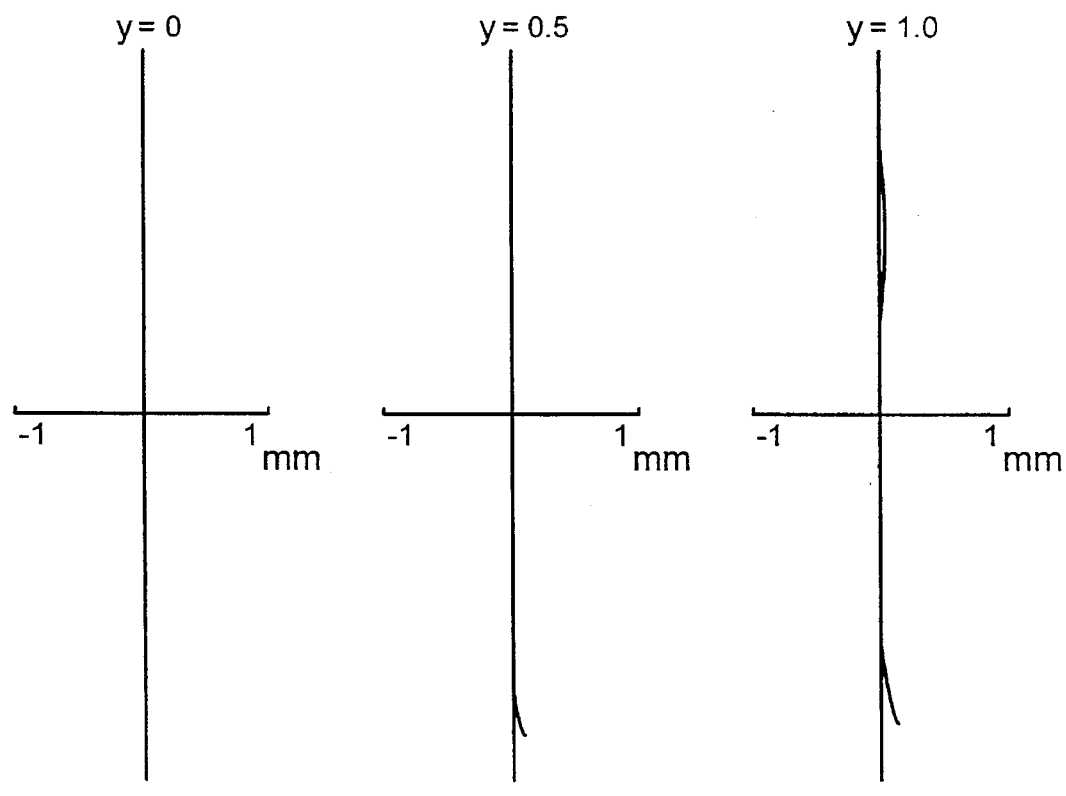
Figure 12A:
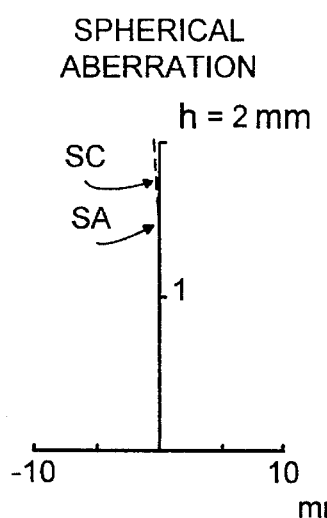
FIG. 12 is a series of aberration diagrams of an aspherical lens of an eleventh embodiment according to the present invention.
Figure 12B:
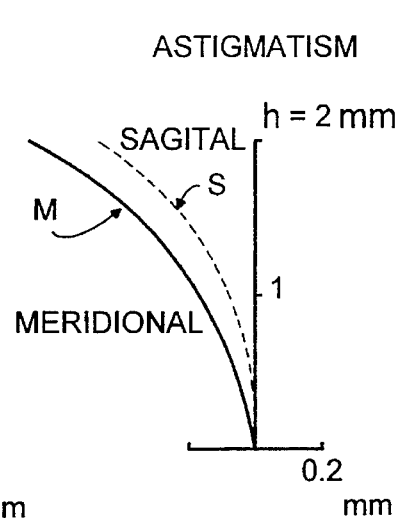
Figure 12C:
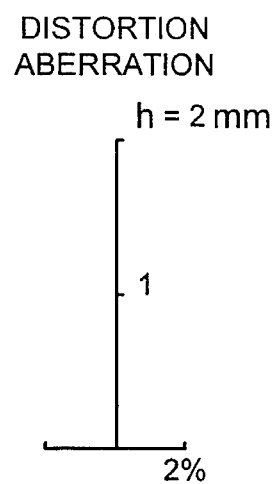
Figure 12D:
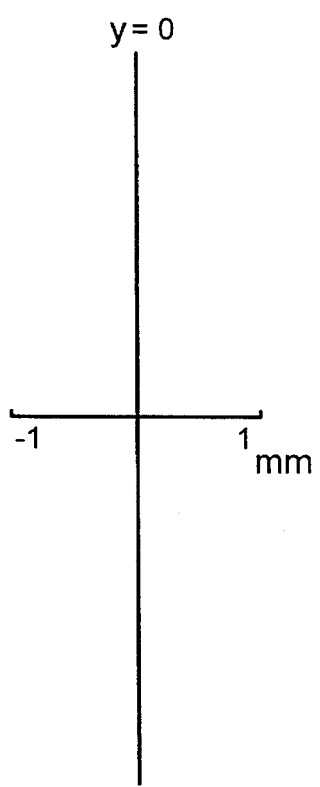
Figure 12E:
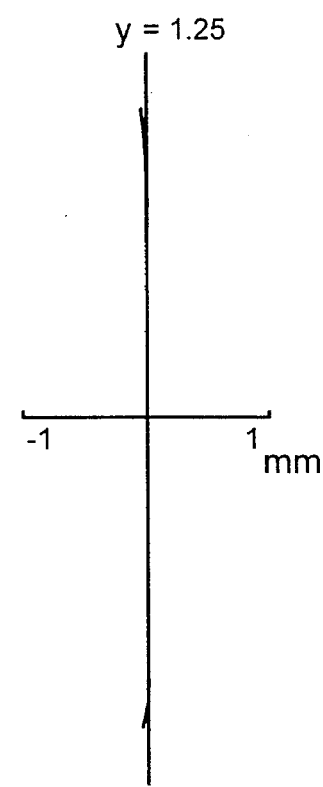
Figure 12F:
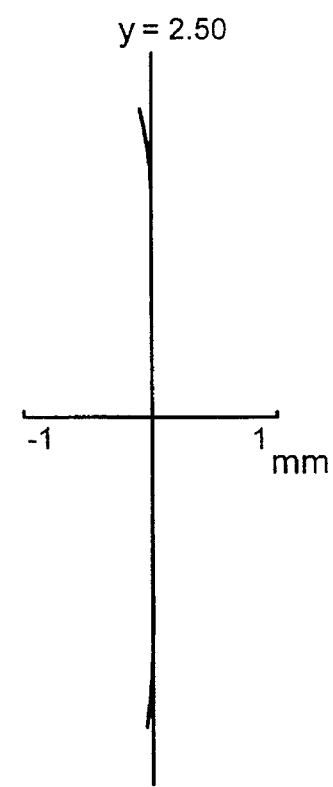

FIG. 3 shows a series of the aberration diagrams of the aspherical lens related to this second embodiment. FIG. 1 indicates that both the spherical aberration and the coma aberration are sufficiently corrected almost down to zero, so that it is possible to obtain the same effect as with the case of the first embodiment.

Embodiment 3

In the third embodiment, the lens is formed with an aspherical surface on the mouse pad side (the $r_1$ surface), and formed of a resin, for instance, such as an acrylic resin, under the following optical conditions:

Focal distance: f= 5.2 mm

Number of aperture: NA= 0.067

Magnification: $\beta$=−4

Refractive index: n= 1.484

Central thickness: d= 3 mm

Lens diameter: $\phi = 4$ mm $r_1$ surface: aspherical surface

Radius of curvature: $r_1$= 7 mm (near the optical axis on the object side)

$r_1(n-1)/f$= 0.652

$K_1$=−3.5288×10$^{-3}$; $A_4$=−1.01557×10$^{-2}$; $A_6$ = −3.76882× 10$^{-8}$;

$r_2$ surface: spherical surface

Radius of curvature: $r_2$=−3.385 mm

FIG. 4 shows a series of the aberration diagrams of the aspherical lens related to this third embodiment. FIG. 4 indicates that both the spherical aberration and the coma aberration are sufficiently corrected almost down to zero.

Embodiment 4

In this fourth embodiment, the lens is formed with an aspherical surface on the light receiving side (the $r_2$ surface) and with a spherical surface of a large radius of curvature on the mouse pad side (the $r_1$ surface), and formed of a resin, for instance, such as an acrylic resin, under the following conditions:

Focal distance: f= 5.62 mm

Number of aperture: NA= 0.064

Magnification: $\beta$=−4

Refractive index: n= 1.484

Central thickness: d= 3 mm

Lens diameter: $\phi = 4$ mm $r_1$ surface: spherical surface

Radius of curvature: $r_1$= 950 mm $r_1(n-1)/f = 81.81$ $r_2$ surface: aspherical surface Radius of curvature: $r_2 = -2{,}723$ mm (near the optical axis on the image plane side)

$K_2 = -7.15611 \times 10^{-1}$; $A_4 = 5.87041 \times 10^{-5}$; $A_6 = -4.76558 \times 10^{-7}$;

FIG. 5 shows a series of the aberration diagrams of the aspherical lens related to this fourth embodiment. FIG. 5 indicates that both the spherical aberration and the coma aberration are sufficiently corrected in spite of the fact that the radius of curvature of the $r_1$ surface is large. In this fourth embodiment, the same effect as with the case of the first embodiment can be obtained.

Embodiment 5

In the fifth embodiment, the lens is formed with an aspherical surface in both surfaces, respectively, and with an aspherical surface of a small radius of curvature on the mouse pad side (the $r_1$ surface), and formed of a resin, for instance, such as an acrylic resin, under the following optical conditions:

Focal distance: f=4.06 mm

Number of aperture: NA= 0.06

Magnification: $\beta = -4$

Refractive index: n= 1.484

Central thickness: d= 3 mm

Lens diameter: $\phi = 4$ mm $r_1$ surface: aspherical surface

Radius of curvature: $r_1 = 2$ mm (near the optical axis on the image plane side)

$r_1(n-1)/f = 0.238$ $K_1 = -1.82983$; $A_4 = 9.13626 \times 10^{-4}$; $A_6 = -7.65687 \times 10^{-9}$;

$r_2$ surface: aspherical surface

Radius of curvature: $r_2 = -55.364$ mm (near the optical axis on the image plane side)

$K_2 = -6.30144 \times 10^{-7}$; $A_4 = 1.08905 \times 10^{-4}$; $A_6 = 3.41233 \times 10^{-9}$;

FIG. 6 shows a series of the aberration diagrams of the aspherical lens related to this fifth embodiment. FIG. 6 indicates that both the spherical aberration and the coma aberration are sufficiently corrected in spite of the fact that the radius of curvature of the $r_1$ surface is small. In this fifth embodiment, the same effect as with the case of the first embodiment can be obtained.

Embodiment 6

In the case of the first to fifth embodiments, the magnification B is determined 4 times. In this embodiment, the magnification is determined to be twice. This double magnification can be obtained by adjusting the interval between the lens and the light receiving element, and therefore it is possible to reduce the optical path length. Further, although the size of the light receiving element is required to be reduced down to ½, this is suitable for reducing the size of the mouse.

In the sixth embodiment, the lens of double magnification is formed with an aspherical surface on the light receiving element side (the $r_2$ surface) and formed of a resin, for instance, such as an acrylic resin, under the following optical conditions:

Focal distance: f=4.38 mm

Number of aperture: NA= 0.13

Magnification: $\beta = -2$

Refractive index (in wave length: 950 mm): n= 1.484

Central thickness: d= 3 mm

Lens diameter: $\phi = 4$ mm $r_1$ surface: spherical surface

Radius of curvature: $r_1 = 7$ mm $r_1(n-1)/f = 0.663$ $r_2$ surface: aspherical surface Radius of curvature: $r_2 = -2.74$ mm (near the optical axis on the image plane side)

$K_2 = -9.93634 \times 10^{-1}$; $A_4 = 2.82918 \times 10^{-3}$; $A_6 = 7.96794 \times 10^{-8}$ FIG. 7 shows a series of the aberration diagrams of the aspherical lens related to this sixth embodiment. FIG. 7 indicates that both the spherical aberration and the coma aberration are sufficiently corrected even in the case of double magnification, so that it is possible to obtain the same effect as with the case of the first embodiment.

Embodiment 7

In the seventh embodiment, the lens of double magnification is formed with an aspherical surface on the mouse pad line side (the $r_1$ surface) and formed of a resin, for instance, such as an acrylic resin, under the following optical conditions:

Focal distance: f= 4.21 mm

Number of aperture: NA= 0.132

Magnification: $\beta = -2$

Refractive index (in wave length: 950 mm): n= 1.484

Central thickness: d= 3 mm

Lens diameter: $\phi = 4$ mm $r_1$ surface: aspherical surface

Radius of curvature: $r_1 = 4$ mm (near the optical axis on the object side)

$r_1(n-1)/f = 0.460$ $K_1 = 6.73026 \times 10^{-1}$; $A_4 = -1.87011 \times 10^{-2}$; $A_4 = 8.54634 \times 10^{-9}$;

$r_2$ surface: spherical surface

Radius of curvature: $r_2 = -3.136$ mm

FIG. 8 shows a series of the aberration diagrams of the aspherical lens related to this seventh embodiment. FIG. 8 indicates that both the spherical aberration and the coma aberration are sufficiently corrected even in the case of the double magnification lens, and therefore it is possible to obtain the same effect as with the case of the first embodiment. Further, where both the surfaces are formed with aspherical surfaces, it is possible to more improve the spherical aberration and the coma aberration, as compared with the case of the sixth and the seventh embodiments.

Embodiment 8

In the eighth embodiment, the lens of double magnification is formed with an aspherical surface on the light receiving element side ($r_2$ surface) and a spherical surface of a small radius of curvature on the mouse pad side ($r_1$ surface), and formed of a resin, for instance, such as an acrylic resin. In this embodiment, the resolving power of the mouse pad can be further increased, and therefore this embodiment can be applied to the case of 300 CPI (the line width: 0.17 mm; and the line interval: 0.17 mm). The optical conditions are as follows:

Focal distance: f= 3.37 mm
Number of aperture: NA= 0.146
Magnification: β=–2
Refractive index (in wave length: 950 nm); n= 1.484
Central thickness: d= 3 mm
Lens diameter: φ= 4 mm
$r_1$ surface: spherical surface
Radius of curvature: $r_1$= 3 mm
$r_1(n-1)/f$= 0.445
$r_2$ surface: aspherical surface
Radius of curvature: $r_2$=–2.604 mm (near the optical axis on the image plane side)
$K_2$= –2.4143; $A_4$=2.50588×$10_{-3}$; $A_6$=2.16449 ×$10^{-7}$ FIG. 9 shows a series of the aberration diagrams of the aspherical lens related to this eighth embodiment. FIG. 9 indicates that both the spherical aberration and the coma aberration are sufficiently corrected. Despite the fact that the resolving power is large and the line width is small, the effect of the aspherical surface in the $r_2$ surface is sufficiently prominent. Further, in this embodiment the cone coefficient K is –2.4, so that the absolute value thereof is fairly small.

Embodiment 9

In the ninth embodiment, the lens of ten-time magnification is formed with an aspherical surface on the light receiving element side (the $r_2$ surface), and formed of a resin, for instance, such as an acrylic resin. When the magnification is determined to be ten times, since the optical path length between the lens and the light receiving element is lengthened, the size of the mouse itself is enlarged. In this embodiment, however, since the size of the light receiving element is increased, there exists an advantage such that the influence of the parts assembly upon the apparatus precision can be relatively reduced. The optical conditions are as follows:

Focal distance: f= 5.89 mm
Number of aperture: NA= 0.026
Magnification: β=–10
Refraction index (in wave length: 950 nm): n= 1.484
Central thickness: d= 3 mm
Lens diameter: φ= 4 mm
$r_1$ surface: spherical surface
Radius of curvature: $r_1$= 8 mm
$r_1(n-1)/f$= 0.657
$r_2$ surface: aspherical surface
Radius of curvature: $r_2$=–3.891 mm (near the optical axis on the image plane side)
$K_2$=–1.20157; $A_4$=6.59658×$10^{-5}$; $A_6$=7.06786 ×$10^{-5}$ FIG. 10 shows a series of the aberration diagrams of the aspherical lens related to this ninth embodiment. FIG. 10 indicates that both the spherical aberration and the coma aberration are sufficiently corrected although the astigmatism is slightly large, so that it is possible to obtain the same effect as with the case of the first embodiment.

Embodiment 10

In the tenth embodiment, the lens of the ten-time magnification is formed with an aspherical surface on the mouse pad side (the $r_1$ surface), and formed of a resin, for instance, such as an acrylic resin, under the following optical conditions:

Focal distance: f= 5.99 mm
Number of aperture: NA= 0.027
Magnification: β=–10
Refractive index (in wave length: 950 nm): n=1.484
Central thickness: d= 3 mm
Lens diameter: φ= 4 mm
$r_1$ surface: aspherical surface
Radius of curvature: $r_1$= 10 mm (near the optical axis on the object side)
$r_1(n-1)/f$= 0.83
$K_1$=–1.26926×$10^{-2}$; $A_4$=–7.19275×$10^{-3}$; $A_6$= 1.89394× $10^{-4}$;
$r_2$ surface: spherical surface
Radius of curvature: $r_2$=–3.885 mm FIG. 11 shows a series of the aberration diagrams of the aspherical lens related to this tenth embodiment. FIG. 11 indicates that the spherical aberration and the coma aberration are both small, so that the same effect as with the case of the first embodiment can be obtained.

Embodiment 11

In this embodiment, the lens is formed with an aspherical surface on both the surfaces thereof, and formed of a resin, for instance, such as an acrylic resin, under the following optical conditions:

Focal distance: f= 5.95 mm
Number of aperture: NA= 0.028
Magnification: β=–10
Refractive index (in wave length: 950 nm): n= 1.484
Central thickness: d= 3 mm
Lens diameter: φ= 4 mm
$r_1$ surface: aspherical surface
Radius of curvature: $r_1$= 9 mm (near the optical axis on the object side)
$r_1(n-1)/f$= 0.76
$K_1$=–1.39914×$10^{-3}$; $A_4$=–3.59582×$10^{-3}$; $A_6$= –1.40872× $10^{-7}$;
$r_2$ surface: aspherical surface
Radius of curvature: $r_2$=–3.773 mm (near the optical axis on the image plane side)
$K_2$=–9.46706×$10^{-1}$; $A_4$=1.04291×$10^{-3}$; $A_6$= 4.77325×$10^{-7}$ FIG. 12 shows a series of aberration diagrams of the aspherical lens related to this first embodiment. FIG. 12 indicates that both the spherical aberration and the coma aberration are sufficiently corrected almost down to zero. The same effect as with the case of the first embodiment can be obtained.

Embodiment 12

In the above-mentioned ninth to eleventh embodiments, the distance l between the line pattern 12 and the $r_1$ surface shown in FIG. 1 is designed to be 5 mm. This distance l can be shortened, as far as no problem arises when the lens is mounted in the mouse body (e.g. the circumference of the lens is located away from the bottom of the mouse housing). Accordingly, in this twelfth embodiment, the distance l is determined to be 3 mm, and the lens of 15-time magnification is formed with an aspherical surface on both lens surfaces, respectively, and formed of a resin, for instance, such as an acrylic resin. The optical path length from the line pattern, through the lens, to the light receiving element is almost the same as with the case of the ninth to eleventh embodiments. The optical conditions are as follows:

Focal distance: f= 3.87 mm

Number of aperture: NA= 0.022

Magnification: β=−15

Refractive index (in wave length: 950 nm): n= 1.484

Central thickness: d= 2.5 mm

Lens diameter: φ= 4 mm $r_1$ surface: aspherical surface

Radius of curvature: $r_1$= 4 mm (near the optical axis on the object side)

$r_1(n-1)/f$= 0.5

$K_1$=−7.29541×$10^{-3}$;    $A_4$=−8.52049×$10^{-3}$;    $A_6$=−3.29918×$10^{-8}$ $r_2$ surface: aspherical surface Radius of curvature: $r_2$=−2.80 mm (near the optical axis on the image plane side)

$K_2$=−8.14467×$10^{-1}$;  $A_4$= 2.20733×$10^{-3}$; $A_6$= 1.28805×$10^{-7}$

FIG. 13 shows a series of aberration diagrams of the aspherical lens related to this embodiment. FIG. 13 indicates that both the spherical aberration and the coma aberration are sufficiently corrected almost down to zero. Further, when the magnification is increased as in this twelfth embodiment, it becomes difficult to correct the aberration by forming an aspherical surface only in one surface of the lens.

Embodiment 13

Figure 14:
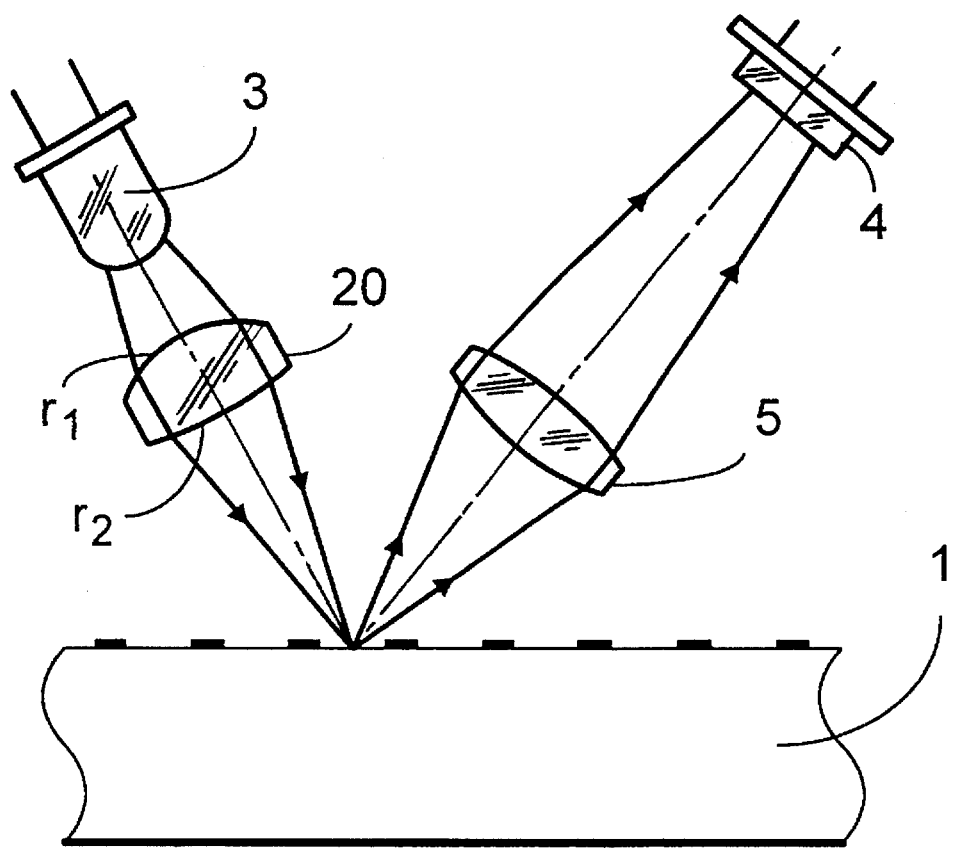
FIG. 14 is a side view showing the construction of a thirteenth embodiment according to the present invention.

FIG. 14 is a cross-sectional view showing the thirteenth embodiment of the present invention, in which the reference numeral 1 denotes a mouse; 3 denotes a light emitting element (LED); 5 denotes an aspherical lens for image forming a line pattern as already explained in the first to twelfth embodiments; and 4 denotes a light receiving element. In the line pattern reading apparatus of the thirteenth embodiment constructed as described above, an aspherical lens 20 is interposed between the light emitting element 3 and the mouse pad 1. This aspherical light converging lens 20 is formed with an aspherical surface on the mouse pad side, and formed of a resin, for instance, such as an acrylic resin. The optical conditions are as follows:

Focal distance: f= 5.5 mm

Number of aperture: NA= 0.11

Magnification: β=−0

Refractive index (in wave length: 950 nm): n= 1.484

Central thickness: d= 2.5 mm

Lens diameter: φ= 5 mm $r_1$ surface: spherical surface

Radius of curvature: $r_1$= 3.70 mm $r_2$ surface: aspherical surface

Radius of curvature: $r_2$=−7.398 mm (near the optical axis on the mouse pad side)

$K_2$=−1.11698×$10^{-3}$; $A_4$= 7.89017×$10^{-3}$; $A_6$= −2.73576×$10^{-4}$

In this embodiment, the $r_2$ surface on the pad side is formed with an aspherical surface. FIG. 15 shows a series of the aberration diagrams of the aspherical lens related to this eighth embodiment. FIG. 15 indicates that the spherical aberration is sufficiently corrected. As a result, it is possible to increase the degree of converging the light emitted from the light emitting element 3. By interposing the condenser lens between the light emitting element 3 and the mouse pad 1, it is possible to reduce the current consumption of the light emitting element 3 down to about ⅓ under the condition that the same photocurrent can be obtained. In addition, since the lens is an aspherical lens, the light converging degree can be further improved, so that it is possible to further reduce the current consumption by another 30%. Further, when an aspherical lens is used to illuminate the line pattern formed on the lower surface of the mouse pad, in addition to the line pattern formed of the upper surface of the mouse pad, it is possible to further reduce the current consumption of the light emitting element. In this connection, the spherical aberration rate obtained when the lens is not formed with an aspherical surface is about 60 times larger than that of this embodiment at the image height from 2 to 2.5 mm.

Embodiment 14

Figure 16:
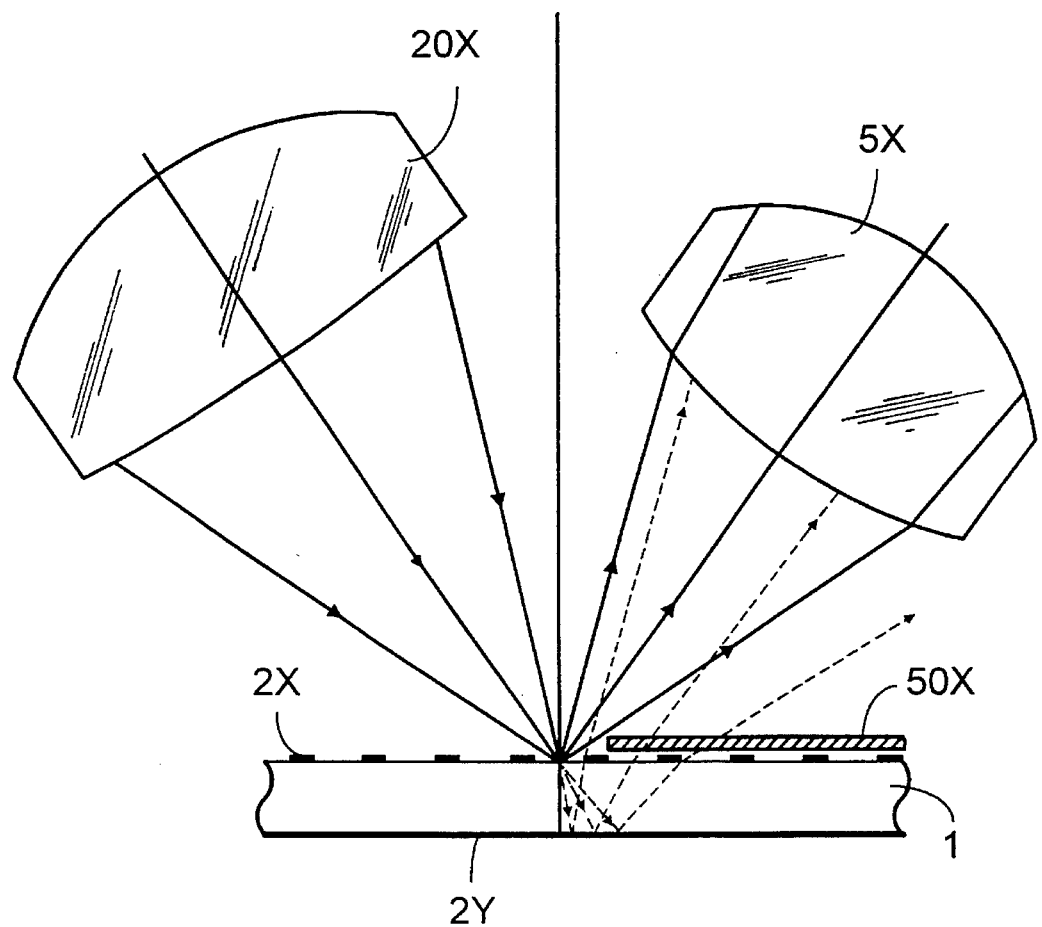
FIG. 16 is a side view showing the construction of a fourteenth embodiment according to the present invention.

FIG. 16 is a side view showing the fourteenth embodiment of the present invention. In this embodiment, an aspherical illumination lens 20X is provided in addition to an aspherical image forming lens 5X, in the same way as in the thirteenth embodiment. The reading apparatus of this embodiment reads the X line pattern 2X formed on the upper surface of the pad 1. The light converged through the illumination lens 20X is focused onto the X line pattern 2X, and then reflected therefrom toward the image forming lens 5X. A part of the light focused on the pad upper surface is allowed to be incident into the transparent material of the pad through the space between the two lines, reflected from the pad lower surface, passed through the space between the two lines on the pad upper surface, and then diverged above the pad surface, as shown by dashed lines in FIG. 16. As described above, the diverged light (stray light) reflected from the lower surface of the pad is introduced into the image forming lens 5X. As a result, the image obtained through the image forming lens is an addition of a clear line image obtained by the light regularly reflected from the upper surface of the pad and a slightly blurred image obtained by the light reflected from the lower surface of the pad and formed near the clear line image. Since this blurred image causes ripple components generated by the reflection from the lower surface of the pad and the generated ripple components are superposed upon the detection signal, this results in a degradation of the detection resolving power. In order to solve this problem in the present embodiment, therefore, a light shading plate 50X for shading the light reflected from the pad lower surface and diverged toward the image forming lens is provided on the upper surface of the mouse pad 1 roughly in parallel to the upper surface thereof. This light shading plate 50X can be provided by changing only the shape of the bottom portion of the housing of the mouse body, or of a lens holder for fixing the lens unit.

Embodiment 15

Figure 17:
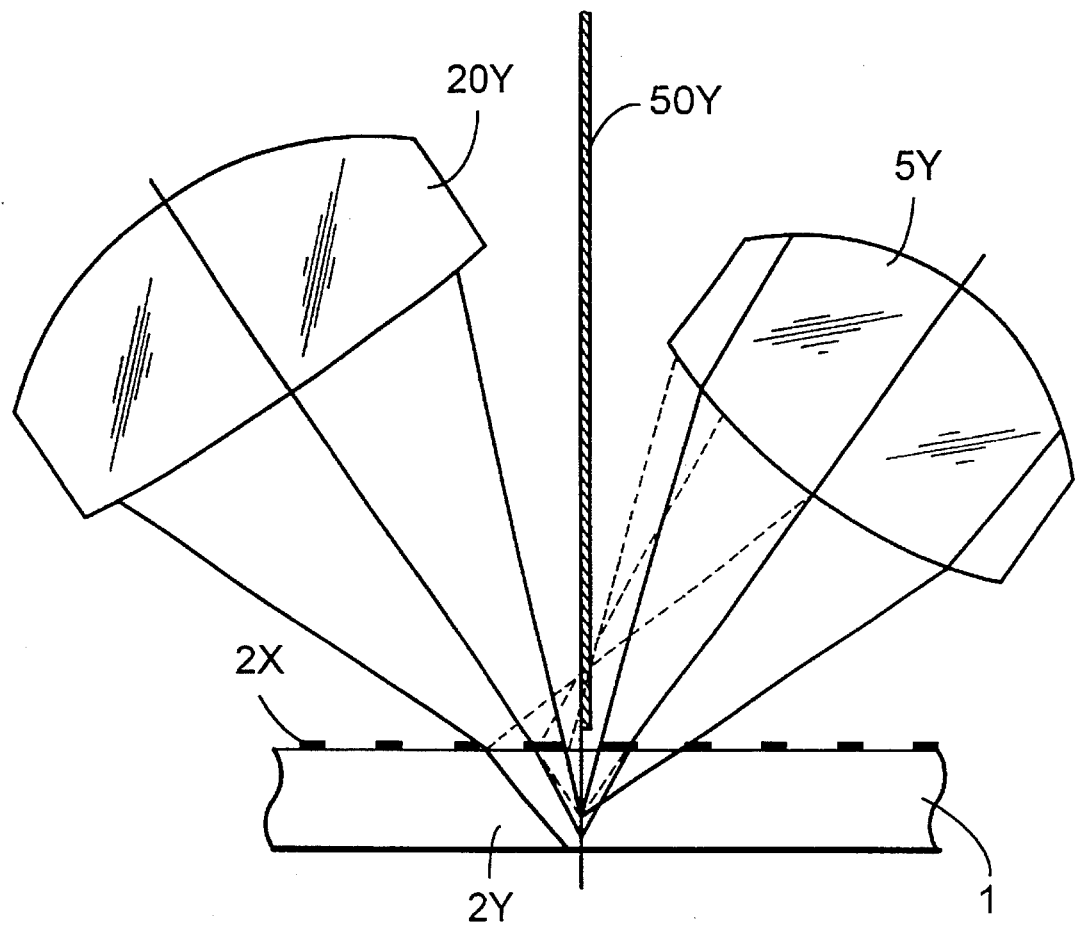
FIG. 17 is a side view showing the construction of a fifteenth embodiment according to the present invention.

FIG. 17 is a side view showing a fifteenth embodiment of the present invention, in which a reading apparatus for reading the Y line pattern 2Y formed on the lower surface of the pad 1 is shown. The light converged through an illumination lens 20Y is focused on the Y line pattern 2Y formed on the lower surface of the pad. The illumination light is allowed to be incident into the transparent material through the upper surface of the pad 1. However, a part of the illuminating light is reflected from the upper surface of the pad 1, and the light reflected from the pad upper surface (stray light) is introduced into the image forming lens 5Y, as shown by the dashed lines in FIG. 17. As a result, in the same way as in the fourteenth embodiment, the image obtained through the image forming lens 5Y is an addition of a clear image obtained by the light regularly reflected from the lower surface of the pad and a slightly blurred image obtained by the light reflected from the upper surface of the pad and formed near the clear line image. Since this blurred image causes ripple components generated by the reflection from the upper surface of the pad and the generated ripple components are superposed upon the detection signal, this results in a degradation of the detection resolving power. In order to solve this problem in the present embodiment, therefore, a light shading plate 50Y for shading the light reflected from the pad upper surface and diverged toward the image forming lens if proved on the upper surface of the mouse pad 1 roughly perpendicular to the upper surface thereof, so that it is possible to improve the detection resolving power without being reduced by the stray light. This light shading plate 50Y can be provided by forming the mouse housing integral with a lens holder for fixing the lens unit.

Embodiment 18

Figure 18A:
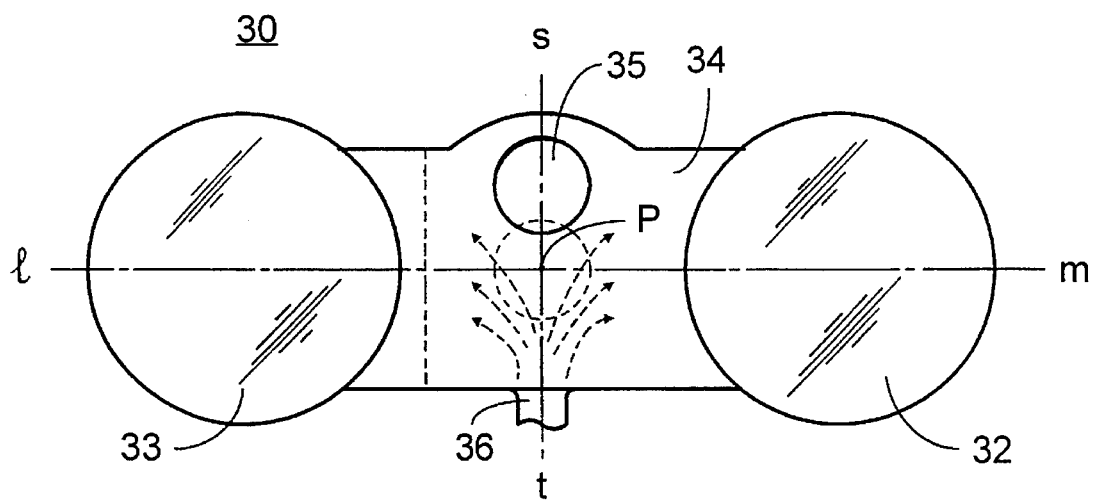
FIG. 18(A) is a plan view showing a resin lens unit of a sixteenth embodiment according to the present invention.
Figure 18B:
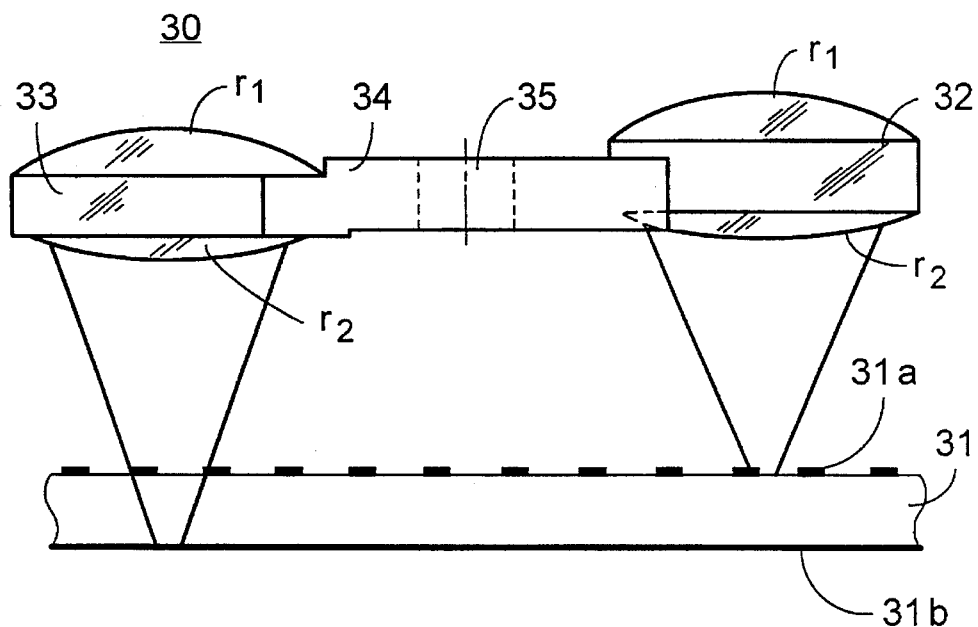
FIG. 18(B) is a side view showing the same.

FIG. 18(A) is a plan view showing an illumination system lens unit disposed between the light emitting element and the mouse pad, and FIG. 18(B) is a side view thereof. The illumination system lens unit 30 is an acrylic resin molded part composed of an X line illuminating aspherical lens portion 32 for converging light emitted from the light emitting element toward the X line pattern 31a formed on the upper surface of the mouse pad 31, a Y line illuminating aspherical lens portion 33 for converging light emitted from the light emitting element toward the Y line pattern 31b formed on the lower surface of the mouse pad 31, and a linking portion 34 for mutually linking both the lens portions 32 and 33 integrally. This lens unit 30 having a pair of the lens portions 32 and 33 and formed integrally is designed to reduce the number of parts and the number of assembly processes required when the mouse is assembled. As shown in FIG. 18(B), the X line illuminating aspherical lens portion 32 is disposed at a position slightly above the linking portion 34 and the Y line illuminating aspherical lens portion 33 is disposed at a position slightly below the linking portion 34. This is because a difference in optical path length between the upper and lower surfaces of the mouse pad at which the light is to be focused is taken into account, under the condition that the optically identical lens portions 32 and 33 are used. When both the lens portions 32 and 33 are composed of two different parts, the mutual adjustment between the two focus points becomes complicated. In this embodiment, however, since both the lens portions 32 and 33 are formed under the same optical conditions with respect to the lens thickness and the refractive index and further formed into a single integral unit by disposing both the lens portions 32 and 33 with a height difference between the two lens portions relative to the pad 31, it is possible to simplify the assembly work. Further, in this embodiment, a through hole 35 for fixing the lens unit 30 is formed in the linking portion 34 during the molding process. Here, this through hole 35 is located on the symmetrical axis s–t of both the lens portions 32 and 33, but offset away from the central line l–m connecting the centers of both the lens portions 32 and 33. Further, a gate 36 for injecting resin is located at the side wall of the linking portion 34 on the side opposite to the through hole 35. For instance, if the through hole 35 is located at an intersection P between the central line 1–m and the symmetrical line s–t, the flow of resin through the gate 36 is obstructed by the presence of the through hole, so that resin is not sufficiently supplied to the portions away from the gate 36 in both the lens portions 32 and 33, thus resulting in a difficulty of forming aspherical lenses of high quality. In this embodiment, however, since the through hole 35 is located being offset away from the intersection P, it is possible to enable a smooth flow of resin to every nook and corner of both the lens portions 32 and 33. That is, resin can easily flow directly from the gate 36 to the lens portions 32 and 33, and additionally resin directed to the through hole 35 located being offset away from the central line l–m is guided along the circumferences of the lenses to the farthest portions of the lens portions 32 and 33 from the gate 36, so that it is possible to prevent the lens portions from local lack of resin and therefore to obtain an aspherical lens of high precision.

Further, a lens holder for mounting the lens unit 30 is formed with a boss portion to which the through hole 35 is pressure fit. Therefore, when the boss portion is pressure passed through the through hole 35, stress is generated at the circumference of the through hole 35. In this case, however, since the through hole 35 is located away from both the lens portions 32 and 33, the stress generated when the lens unit 30 is mounted hardly exerts a harmful influence upon both the lens portions 32 and 33, thus making it possible to prevent the lens portions 32 and 33 from being deformed (warp, distortion, etc.).

Embodiment 17

Figure 19A:
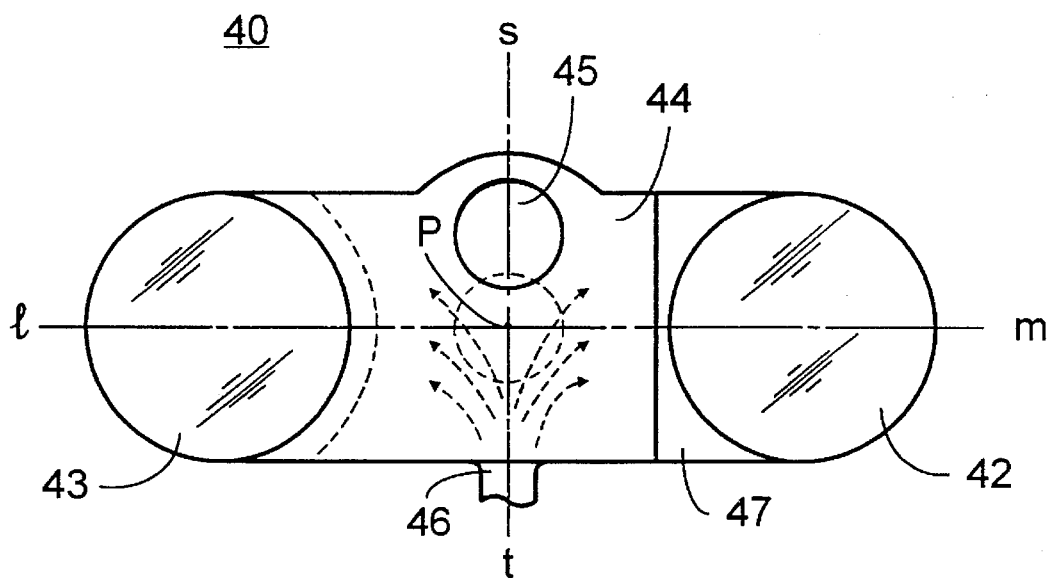
FIG. 19(A) is a plan view showing a resin lens unit of a seventeenth embodiment according to the present invention.
Figure 19B:
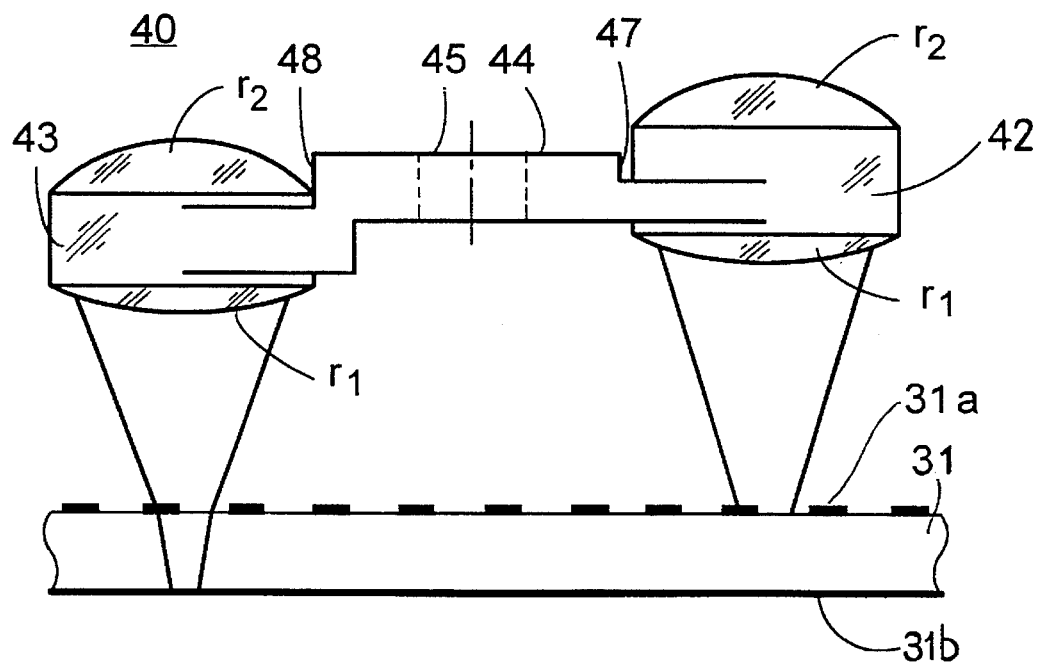
FIG. 19(B) is a side view showing the same.

FIG. 19(A) is a plan view showing an image forming lens unit disposed between the mouse pad and the light receiving element, and FIG. 19(B) is a side view thereof. The image forming system lens unit 40 is an acrylic resin molded parts composed of an X line image forming aspherical lens portion 42 for image forming the X line pattern 31a formed on the upper surface of the mouse pad 31 on the light receiving element, a Y line image forming aspherical lens portion 43 for image forming the Y line pattern 31b formed on the lower surface of the mouse pad 31 on the light receiving element, and a linking portion 44 for mutually linking both the lens portions 42 and 43 integrally. As shown in FIG. 19(b), the X line image forming aspherical lens portion 42 is disposed at a position slightly above the linking portion 44 and the Y line image forming aspherical lens portion 43 is disposed at a position slightly below the linking portion 44. This is because a difference in optical path length between the upper and lower surfaces of the mouse pad is taken into account, under the condition that the optically identical lens portions 42 and 43 are used, in the same way as in the thirteenth embodiment. Further, in this embodiment, a through hole 45 for fixing the lens unit 40 is formed in the linking portion 44 during the molding process. Here, in the same way as in the thirteenth embodiment, this through hole 45 is located on the symmetrical axis s–t of both the lens portions 42 and 43, but, offset away from the central line l–m connecting both the centers of the lens portions 42 and 43. Further, a gate 46 for injecting resin is located at the side wall of the linking portion 44 on the side opposite to the through hole 45. Therefore, in the same way as in the thirteenth embodiment, it is possible to prevent the lens portions from local lack of resin and therefore to obtain an aspherical lenses of high precision. Similarly, a lens holder for mounting the lens unit 40 is formed with a boss portion to which the through hole 45 is pressure fit. In this case, similarly, since the through hole 45 is located away from both the lens portions 42 and 43, the stress generated when the lens unit 40 is mounted hardly exerts a harmful influence upon both the lens portions 42 and 43, thus making it possible to prevent the lens portions 42 and 43 from being deformed (warp, distortion, etc.). Further, in this embodiment, the linking portion 42 is formed with a recessed portion 47 on one side of the lens portion 42. The resin flowing from the gate 46 flows toward the lens portion 43, after the flow direction is changed at a stepped surface 48 formed in the linking portion 45. In this case, however, if no recessed portion 47 exists, the resin flows easily from the gate 46 to the lens portion 42 without any resistance and therefore the resin is easy to flow to the lens portion 42, so that there exists a problem in that the flows of resin to both the lens portions 42 and 43 are unequal to each other.

In this embodiment, however, since the recessed portion 47 is formed, it is possible to restrict the flow of resin toward the lens portion 42 to some extent, so that it is possible to make the flows of resin to both the lens portions 42 and 43 equal to each other.

An example of an optical mouse which uses the above-mentioned embodiments 16 and 17 will be described hereinbelow (the optical mouse is explained by use of the seventeenth embodiment).

Figure 21:
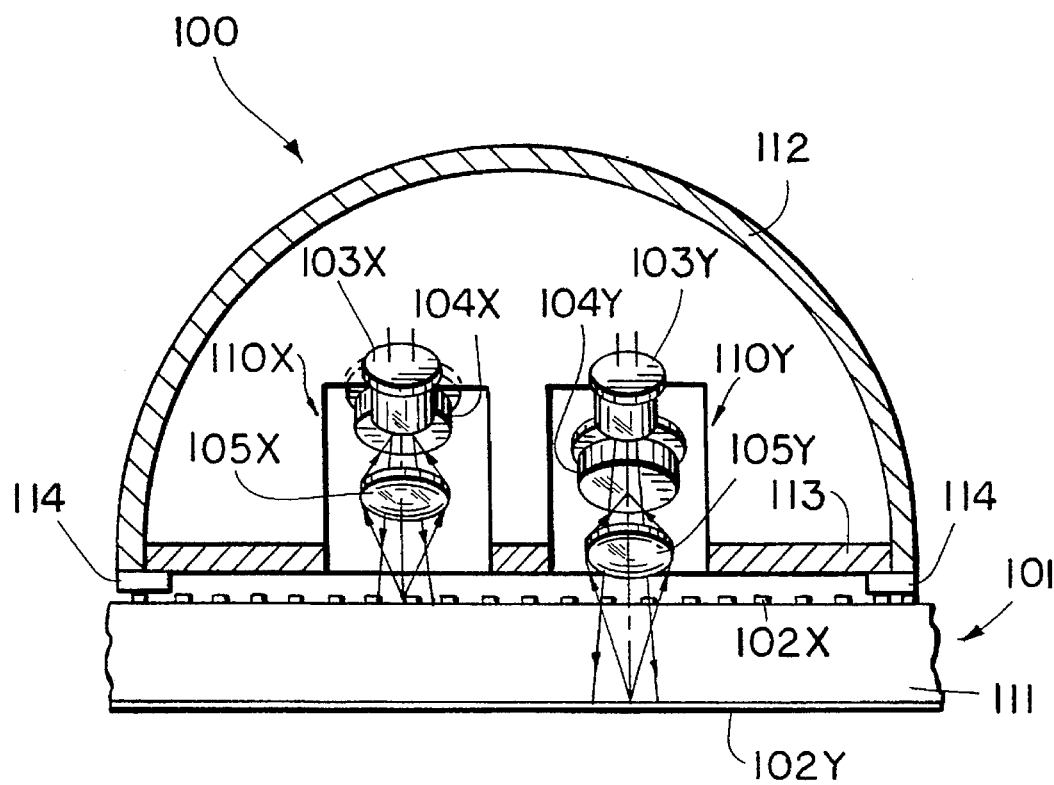
FIG. 21 is a cross-sectional view showing a prior art optical mouse.
Figure 22:
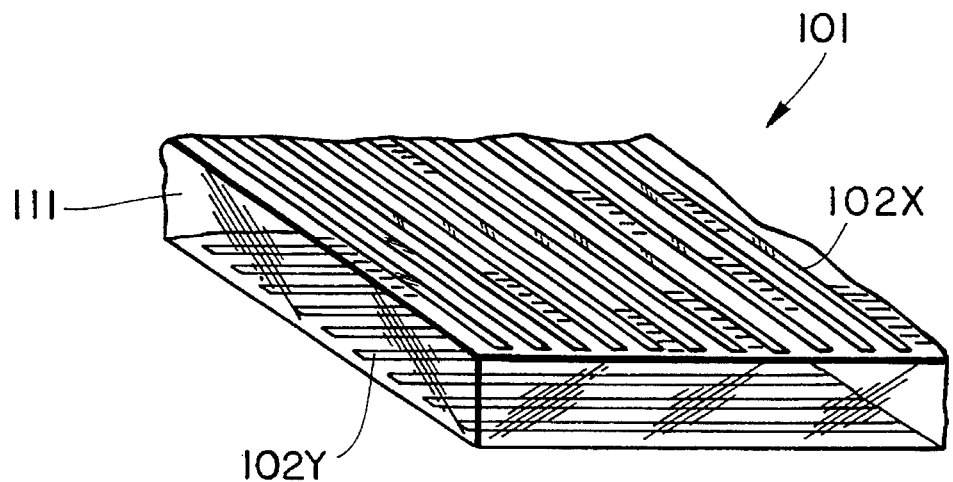
FIG. 22 is a perspective view showing a mouse pad on the surface of which the optical mouse is movable.
Figure 23A:
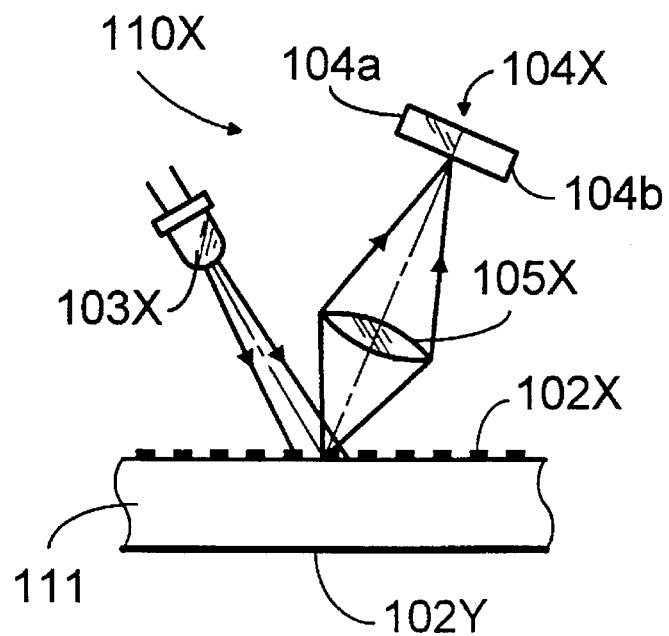
FIGS. 23(A) and 23(B) are side views showing a line pattern reading apparatus of the prior art optical mouse.
Figure 23B:
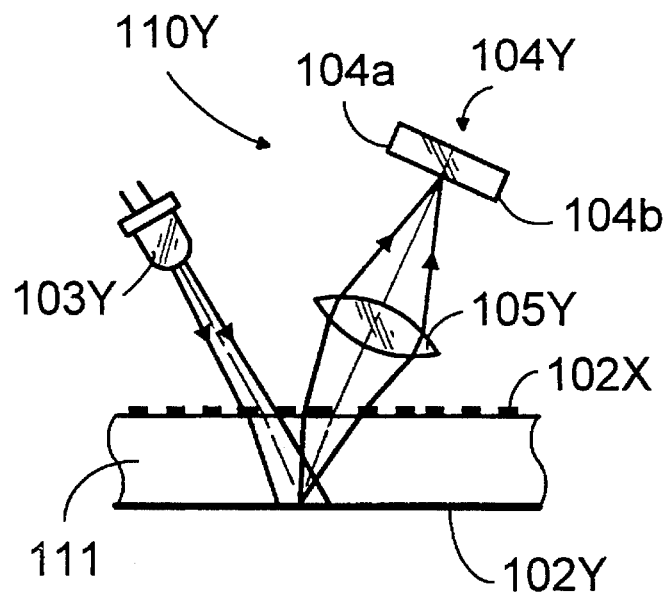
Figure 24:
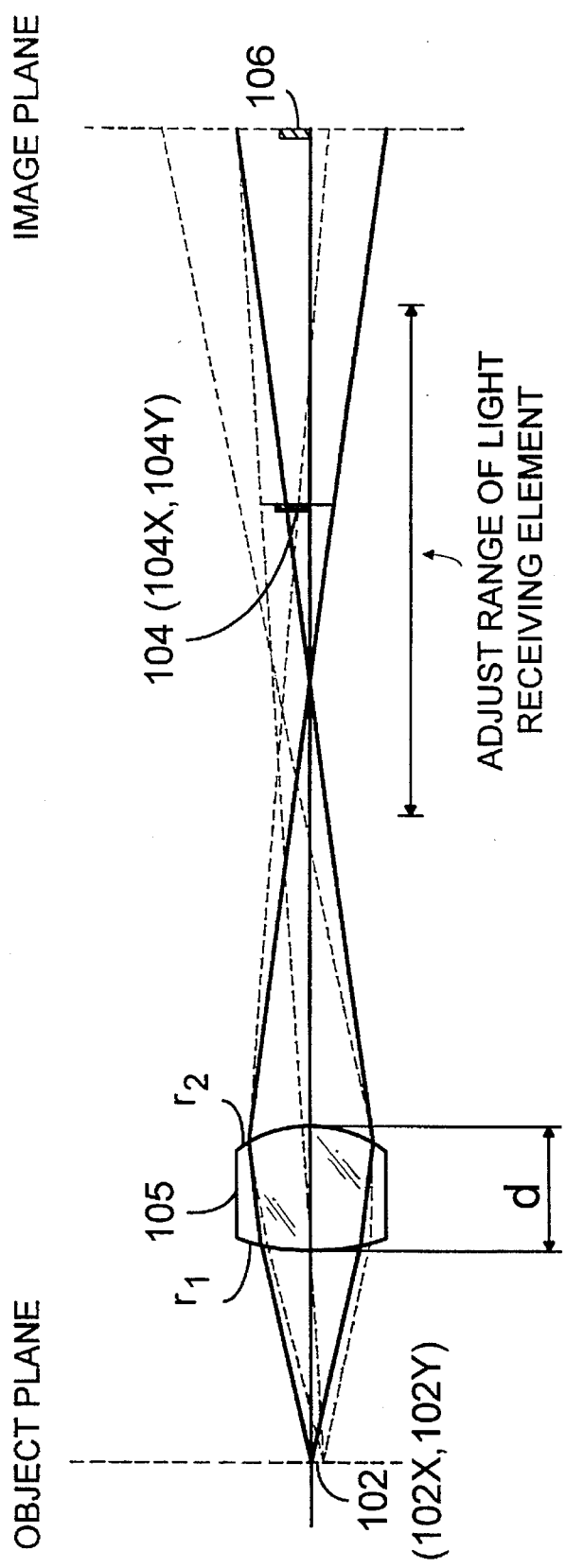
FIG. 24 is an optical path diagram showing the light routes of the line pattern reading apparatus of the prior art optical mouse.

Further, in FIG. 20, only a bottom plate (corresponding to the bottom plate 113 shown in FIG. 21) and line pattern reading apparatuses (corresponding to the apparatuses 110X and 110Y) for reading the X line pattern and the Y line pattern are shown. A housing (corresponding to the housing 112) and a mouse pad (corresponding to the mouse pad 111) are not shown, because these are the same in structure as those of the prior art optical mouse shown in FIG. 21.

In FIG. 20, the reference numeral 50 denotes a line pattern reading apparatus for reading X and Y patterns, respectively. The line pattern reading apparatus comprises two light sources (LEDs) 52X and 52Y for illuminating the X and Y line patterns, respectively; two light receiving elements 53X and 53Y for detecting the X and Y line patterns, respectively; a resin lens unit 40 for forming two real images of the X and Y line patterns on the light receiving elements 53X and 53Y, respectively; and a holder 51 for supporting the light sources (LEDs) 52X and 52Y and the resin lens unit 40 in a predetermined mutual positional relationship with respect to each other.

For instance, the through hole 45 formed in the linking portion 44 of the resin lens unit 40 is pressure fit to a boss 55 formed in the holder 51 to fix the lens unit to the holder 51.

Further, the light receiving elements 53X and 53Y for detecting the X and Y line patterns are arranged on a bottom plate 56 at such positions that the real images of X and Y line patterns are formed on the resin lens unit 40.

In FIG. 20, mirrors 54X and 54Y for changing the light travel directions are disposed between the resin lens unit 40 and the light receiving elements 53X and 53Y under due consideration of the optical path length and the space therearound.

Further, although the holder 51 supports the light sources (LEDs) 52X and 52Y, the resin lens unit 40 and the mirrors 54X and 54Y together, it is of course possible to support these parts by use of different holders, separately.

Further, in practice, although a circuit for activating the light sources (LEDs) 52X and 52Y and another circuit for processing the signals of the light receiving elements 53X and 53Y are arranged on the bottom plate 56, these circuits are omitted for the sake of brevity.

As described above, since the present invention is characterized in that the lens of the illumination system and/or the image forming system for the optical mouse is formed with an aspherical lens under predetermined optical conditions, the following effects can be obtained:

(1) When the aspherical lens is adopted for the image forming lens, since the spherical aberration can be corrected, it is possible to read the line pattern at a high resolving power. As a result, it is unnecessary to adjust the light receiving element at an optimum position on the lens side from the image plane, and therefore the light receiving element can be simply set on the image plane surface unconditionally, so that it is possible to simplify the assembly and the adjusting work of the reading apparatus. Since a clear real image can be obtained on the image plane, the phase difference signal obtained by the two light receiving elements can be also easily separated, and therefore it is possible to eliminate a detection error in the mouse movement direction. Further, since a clear image can be obtained without any blur, even if the intensity of light emitted from the light emitting diode is small, it is possible to obtain a reliable signal. In other words, it is possible to realize a mouse of small power consumption by the reduction of the intensity of light, as compared with the prior art apparatus. Further, the life expectancy of the elements of the light emitting system can be increased.

(2) When the aspherical lens is adopted for the illuminating system, since the spherical aberration can be corrected, it is possible to increase the convergence rate of the light emitted from the light emitting element. Therefore, since a clear image can be formed, it is possible to conversely reduce the current consumption of the light emitting element.

(3) Further, when the light shading member is adopted, since the stray light reflected from the surface not to be detected of the mouse pad and then introduced into the image forming lens can be suppressed, it is possible to realize the mouse of high resolving power.

(4) Further, in the resin lens unit of the present invention, it is possible to form a high precise aspherical lens on both the lens portions, respectively. Further, it is possible to reduce the stress applied to the lens portions generated when the lens unit is mounted. As a result, it is possible to obtain a clear image without any blur, by eliminating the spherical aberration, in spite of the resin lens.

While the foregoing description and drawings represent the preferred embodiments of the present invention, it will be obvious to those skilled in the art that various changes and modifications may be made therein without departing from the true spirit and scope of the present invention.

What is claimed is:

1. An optical mouse comprising:

an illumination system for converging light emitted from a light emitting element to a light pattern of a mouse pad;

an image forming system for forming an image of the light pattern on a side of a light receiving element; and an aspherical lens having a positive refractive index and formed with an aspherical surface in at least one surface thereof, said aspherical lens being part of at least one of said illumination system and said image forming system, wherein said aspherical lens is a single lens for constituting said image forming system and satisfying the following optical conditions:

$2<|\beta|<15$ $0.2<r_1 \cdot (n-1)/f$ $-3<K_2<0$ $0.012<NA<0.18$ where $\beta$: $r_1$: a radius of curvature of a surface of the lens on the mouse pad side;

n: the refractive index of lens material (for a wave length: 950 nm);

f: a focal distance;

$K_2$: a cone coefficient; and

NA: the number of apertures.

2. The optical mouse of claim 1, wherein the aspherical lens surface of said aspherical lens is directed toward the light emitting element.

3. The optical mouse of claim 1, which satisfies the following optical conditions:

$r_2<r_1$ where $r_2$: a radius of curvature of a surface of the lens on the light receiving element side.

4. The optical mouse of claim 1, wherein said aspherical lens is made of a synthetic resin.

5. In an optical mouse having an illumination system for converging light emitted from a light emitting element to a light pattern of a mouse pad and an image forming system for forming an impage of the light pattern on a side of a light receiving element, the improvement comprising an aspherical lens having a positive refractive index and formed with an aspheric surface in at least one surface thereof, said aspherical lens being used for at least one of said illumination system and said image forming system, said aspheric lens being a single lens for constituting said image forming system and satisfying the following optical conditions:

$2<|\beta|<15$ $0.2<r_1 \cdot (n-1)/f$ $-3<K_2<0$ $0.012<NA<0.18$ where $\beta$: $r_1$: a radius of curvature of a surface of the lens on the mouse pad side;

n: the refractive index of lens material (for a wave length: 950 nm);

f: a focal distance;

$K_2$: a cone coefficient; and

NA: the number of apertures.

6. The optical mouse of claim 5 wherein said aspherical lens forms part of said illumination system.

7. The optical mouse of claim 5 wherein said aspherical lens is made of a synthetic resin.

* * * * *